United States Patent
Datta et al.

(10) Patent No.: US 12,395,321 B2
(45) Date of Patent: Aug. 19, 2025

(54) DECENTRALIZED MULTI-AUTHORITY ATTRIBUTE-BASED INNER-PRODUCT FUNCTIONAL ENCRYPTION

(71) Applicant: NTT Research, Inc., Sunnyvale, CA (US)

(72) Inventors: Pratish Datta, Sunnyvale, CA (US); Monosij Maitra, Darmstadt (DE); Tapas Pal, Tokyo (JP)

(73) Assignee: NTT Research, Inc., Sunnyvale, CA (US)

( * ) Notice: Subject to any disclaimer, the term of this patent is extended or adjusted under 35 U.S.C. 154(b) by 289 days.

(21) Appl. No.: 18/192,775

(22) Filed: Mar. 30, 2023

(65) Prior Publication Data

US 2023/0353346 A1     Nov. 2, 2023

Related U.S. Application Data

(60) Provisional application No. 63/325,608, filed on Mar. 30, 2022.

(51) Int. Cl.
    *H04L 9/08*       (2006.01)
    *H04L 9/06*       (2006.01)
    *H04L 9/30*       (2006.01)

(52) U.S. Cl.
    CPC .......... *H04L 9/0825* (2013.01); *H04L 9/0618* (2013.01); *H04L 9/30* (2013.01)

(58) Field of Classification Search
    CPC ........ H04L 9/0825; H04L 9/0618; H04L 9/30
    See application file for complete search history.

(56) References Cited

U.S. PATENT DOCUMENTS

| | | | | |
|---|---|---|---|---|
| 8,559,631 | B1* | 10/2013 | Waters | H04L 9/085 |
| | | | | 726/30 |
| 9,183,411 | B2* | 11/2015 | Takashima | H04L 9/0847 |
| 9,209,974 | B1* | 12/2015 | Akinyele | H04L 9/088 |
| 2012/0300936 | A1* | 11/2012 | Green | H04L 9/088 |
| | | | | 380/278 |
| 2013/0339754 | A1* | 12/2013 | Takashima | H04L 9/3073 |
| | | | | 713/189 |
| 2017/0061833 | A1* | 3/2017 | Joye | H04L 9/008 |
| 2017/0331622 | A1* | 11/2017 | Kawai | H04L 9/16 |
| 2018/0357933 | A1* | 12/2018 | Takashima | H04L 9/0618 |

OTHER PUBLICATIONS

"Allison Lawko", "Brent Waters", "Decentralizing Attribute-Based Encryption", pp. 1-31 (Year: 2011).*
"Kan Yang", "Xiaohua Jia", "Attributed-based Access Control for Multi-Authority Systems in Cloud Storage", 32nd IEEE International Conference on Distributed Computing Systems (Year: 2012).*

(Continued)

*Primary Examiner* — Darshan I Dhruv
(74) *Attorney, Agent, or Firm* — CipherLaw

(57) ABSTRACT

A decentralized multi-authority attribute-based inner-product functional encryption FE (MA-ABIPFE) scheme in the prime-order bilinear groups under target-group-based assumptions is used for encryption. In some embodiments, any party can become an authority and there is no requirement for any global coordination other than the creation of an initial set of common reference parameters.

20 Claims, 6 Drawing Sheets

(56) References Cited

OTHER PUBLICATIONS

"Allison Lewko, Brent Waters", "Decentralizing Attribute-Based Encryption" (Year: 2015).*
"Kan Yang, Xiaohua Jia", "Attirbuted-based Access Control for Multi-Authority System in Cloud Storage" (Year: 2012).*
EPO Search Report in Application No. 23165683.6-1218 dated Aug. 16, 2023; 9 pgs.
Pratish Datta et al: "Decentralized Multi-Authority ABE for NC^1 from Computational-BDH", IACR, International Association for Cryptologic Research; Sep. 30, 2021; 25 pgs.
Shweta Agrawal et al: "Multi-Party Functional Encryption", IACR, International Association for Cryptologic Research; Sep. 14, 2021; 72 pgs.
Edouard Dufour Sans et al: "Unbounded Inner Product Functional Encryption with Succinct Keys", IACR, International Association for Cryptologic Research; 2019; 12 pgs.

* cited by examiner

DECENTRALIZED MULTI-AUTHORITY ATTRIBUTE-BASED INNER-PRODUCT FUNCTIONAL ENCRYPTION

CROSS-REFERENCE TO RELATED APPLICATIONS

This application claims the benefit of U.S. Provisional Application No. 63/325,608, filed Mar. 30, 2022, the entire contents of which are incorporated herein by reference.

FIELD OF THE INVENTION

The disclosure relates to a decentralized multi-authority functional encryption system making use of prime-order groups for improved efficiency.

BACKGROUND OF THE INVENTION

Functional encryption (FE), a generalization of public-key encryption (PKE), enables applications that involve computing on large-scale encrypted data while maintaining their privacy. Since its inception, building FE has mainly been about theoretical (and inefficient) schemes for general functions or efficient constructions for specific functions of practical interest.

Inner-product FE (IPFE) is a specific class of FE that facilitates linear computation on encrypted data. In IPFE, a ciphertext CT(x) encodes a vector x of length l (say) and a secret key $SK_y$ is tied to a vector y of length l. Decrypting CT(x) with $SK_y$ reveals the inner-product x·y. The linear functionality, although simple, has potential applications both in theory and practice, such as computing weighted sums of data sets, evaluating conjunctions, disjunctions, and polynomials, building trace-and-revoke systems, non-interactive hidden-weight coin-flipping protocols, deep learning and privacy-preserving machine learning.

However, IPFE suffers from an inherent limitation. A set of secret keys for l linearly independent vectors $\{y_i\}_{i \in [l]}$ may divulge the entire x! Thus, releasing enough keys requires an extra care since it may result in a direct attack to the IPFE system. A natural choice to restrict this leakage is to employ an attribute-based encryption (ABE) (a subclass of FE) as an access control on IPFE. In particular, each secret key and ciphertext may now additionally be associated to the user's attributes att and a policy P respectively. This work focuses on ciphertext-policy ABE and not on its dual, i.e., key-policy ABE. Decryption yields x·y as before, but only when att satisfies P. With this extra layer, data may get breached only when enough keys satisfying P in CT are provided.

Though ABIPFE offers more expressive functionality than normal ABE/IPFE, it possesses a drawback similar to those primitives—one single authority is responsible for generating secret keys for all the attributes in the system. Most of the existing ABIPFEs have been explored in such single authority setting which is not only a disadvantage from the point of view of trust but also a limitation for several practical applications. An unavoidable phenomenon in reality is that different authorities control different attributes, for example, academic degrees are in control of universities, job titles are handled by companies, etc.

MA-ABE composition IPFE. To address this issue, inspired from the notion of multi-authority ABE (MA-ABE) which allows different authorities to control different attributes in the system independently, prior work introduced multi-authority ABIPFE (MA-ABIPFE) which is an extension of ABIPFE in the sense of combining MA-ABE with IPFE. More precisely, a secret key of MA-ABIPFE consists of several ABIPFE secret keys generated by independent authorities which are in control of different set of attributes. The policy associated with a ciphertext is now a function of all the attributes related to the keys and a successful decryption occurs (i.e. the inner product is recovered) only if the set of attributes satisfies the policy. The fact that the trust is now distributed to several independent authorities enriches the application arena of MA-ABIPFE, which includes computing average salary of a group of employees holding a specific job titles and a certain set of academic degrees, statistics determining mental health of the students from different departments of a university, average tax paid by the employees working in different sectors of a specific organization, and so on.

In spite of facilitating an enormous field of applications, the notion of MA-ABIPFE has not been explored much in the literature. In fact the only existing construction of MA-ABIPFE is due to prior work and that too suffers from several efficiency drawbacks. The MA-ABIPFE of prior work captures policies realized by linear secret sharing scheme (LSSS) and is built in the composite-order pairing groups. The security is based on variants of subgroup decision assumptions which are composite-order group-based assumptions related to the source groups. The MA-ABIPFE of prior work is not an exception as it can be seen that decrypting a cipher-text requires an unacceptable time of around five days. One possible solution to address this efficiency bottleneck is to explore constructions of the primitive in prime-order pairing groups which delivers much better performance and parameters than the one designed in composite-order groups.

Another limitation of the MA-ABIPFE of prior work is that the number of attributes controlled by each authority has to be fixed during the global setup, that is, it only supports small universe of attributes. This is clearly an essential barrier towards practical deployment of the protocol since it may not be possible to predict or foresee the future attributes that will join the system, for example, new academic degrees might be added to a university program or new departments could be founded within a company, which result in an unknown number of growth to the list of attributes that already exists in the system. To mitigate this issue, we need a large universe MA-ABIPFE, similar to large universe MA-ABE, that provides the flexibility to add an exponential number of attributes to the system at any point of time, and more importantly those attributes need not be enumerated at the system setup. Along with small-universe constraint, the MA-ABIPFE of prior work also suffers from the so called "one-use" restriction meaning that the number of times a particular attribute can appear within a given policy is bounded, leaving a negative impact concerning the efficiency of the scheme.

Finally, building any cryptographic primitive under different assumptions is important from other aspects. It grows confidence in the existence of the primitive and motivates us to work further towards its use in practice. Further, instantiating a primitive only under one particular class of assumptions (e.g., MA-ABIPFE from source group assumptions) is not desirable since in future any kind of attack on such assumptions might threaten the security provided by that particular class of assumptions (e.g., the source group assumptions), making the instantiation perilous.

BRIEF SUMMARY OF THE INVENTION

We disclose a small-universe MA-ABIPFE scheme based on the DBDH assumption. Next, we upgrade our small-universe scheme to the first large-universe MA-ABIPFE scheme whose security is established under the L-DBDH assumption. We justify our L-DBDH assumption in the generic bilinear group model. The MA-ABIPFEs are built in the prime-order pairing groups and delivers a significant boost regarding the efficiency in comparison with the prior work MA-ABIPFE.

We present new decentralized multi-authority attribute-based inner-product FE (MA-ABIPFE) schemes in the prime-order bilinear groups under target-group-based assumptions. More precisely, our results are as follows:

1. We build the first small universe MA-ABIPFE supporting access structures captured by linear secret sharing schemes (LSSS) in prime-order bilinear groups under the Decisional Bilinear Diffie-Hellman (DBDH) assumption. Compared to the prior work, the disclosed scheme excels in the following grounds:
   Its security is based solely on a target-group assumption which is qualitatively weaker and simpler than the source-group based ones used by Agrawal et al. The scheme enjoys a significantly improved concrete performance since prime-order groups are known to provide smaller sizes and faster computations compared to their composite-order analogues. It also provides the first FE scheme beyond MA-ABE or IPFE under a target-group assumption.
2. We build the first large universe MA-ABIPFE scheme under any assumption. Our scheme relies on a parametrized variant of the DBDH (called the L-DBDH) assumption in prime-order bilinear groups in the random oracle model. The secret key and ciphertext sizes in the scheme are comparable to our small universe MA-ABIPFE. We justify the intractability of the L-DBDH assumption in the generic bilinear group model.

Our schemes are proven secure in the static security model adapted to the MA-ABIPFE functionality, where the adversary is asked to submit all its challenge ciphertext, secret key and authority corruption queries immediately after seeing the global public parameters.

Some embodiments of the invention include systems, methods, network devices, and machine-readable media for a multi-authority functional encryption scheme, the scheme comprising:

executing a global setup routine, the global setup routine comprising:
  receiving a security parameter $\lambda$;
  generating two groups G and $G_T$ with generators g and $g_T$;
  outputting global parameter GP based on groups G and $G_T$;
executing a local setup routine to generate public keys and master secret keys, the local setup routine comprising:
  based on the global parameter GP:
    1. generating a random vector as a and a random matrix Y;
    2. computing $g_T^a$;
    3. computing $g^Y$;
  outputting a public key as $g_T^a$ and $g^Y$;
  outputting a master secret key as a and Y;
generating a secret key K by:
  receiving a global identifier GID for a user;
  receiving the master secret key for an authority;
  receiving the global parameter GP;
  receiving a function u representing a linear function;
  based on the global identifier GID, master secret key, and global parameter GP:
    1. computing $g^{a \cdot u}$;
    2. computing a hash function on the GID combined u and i to generate group elements $h_i$;
    3. computing $h_i^{y_i \cdot u}$ where $y_i$ is the $i^{th}$ row of Y;
  outputting the secret key $K = g^{a \cdot u} h_i^{y_i \cdot u}$;
executing an encryption routine by:
  receiving the global parameter GP, an access structure M, the public keys, and a message v;
  sampling a random vector r and two random matrices B and X, the matrices having row indices i, wherein the first row the matrix B is z;
  based on the global parameter GP, an access structure M, the public keys, and a message v:
    1. computing $C_0 = g_T^{v+z}$;
    2. computing $C_{1,i} = g_T^{M_i * B + r_i * a_i}$;
    3. computing $C_2 = g^T$;
    4. computing $C_{3,i} = g^{M_i * X + r * Y_i}$;
  outputting $C_0, C_{1,i}, C_2, C_{3,i}$ as a ciphertext;
executing a decryption routine:
  receiving the ciphertext;
  receiving the secret key K;
  receiving the global parameter GP;
  receiving the global identifier GID for the user;
  based on the global identifier GID, the ciphertext, secret key K, and global parameter GP:
    1. computing the hash function on the GID combined with u and i to generate group elements $h_i$;
    2. computing $d_i = e(h_i, C_{3,i} * u)$, wherein e is a bilinear map;
    3. computing $w_i = e(K, C_{2,i})$;
  outputting $C_0 * u / (C_{1,i} * u * d_i) / w_i$.

Further embodiments can include distributing the secret key over a communications network by only one authority. In further embodiments, each user is identified by a set of attributes and a decryption ability for each encrypted message is based on a function of the attributes. Further embodiments include distributing the secret key k over a communications network by any polynomial number of independent authorities.

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings.

DETAILED DESCRIPTION

1 Overview

1.1 Our Results

Figure 1:
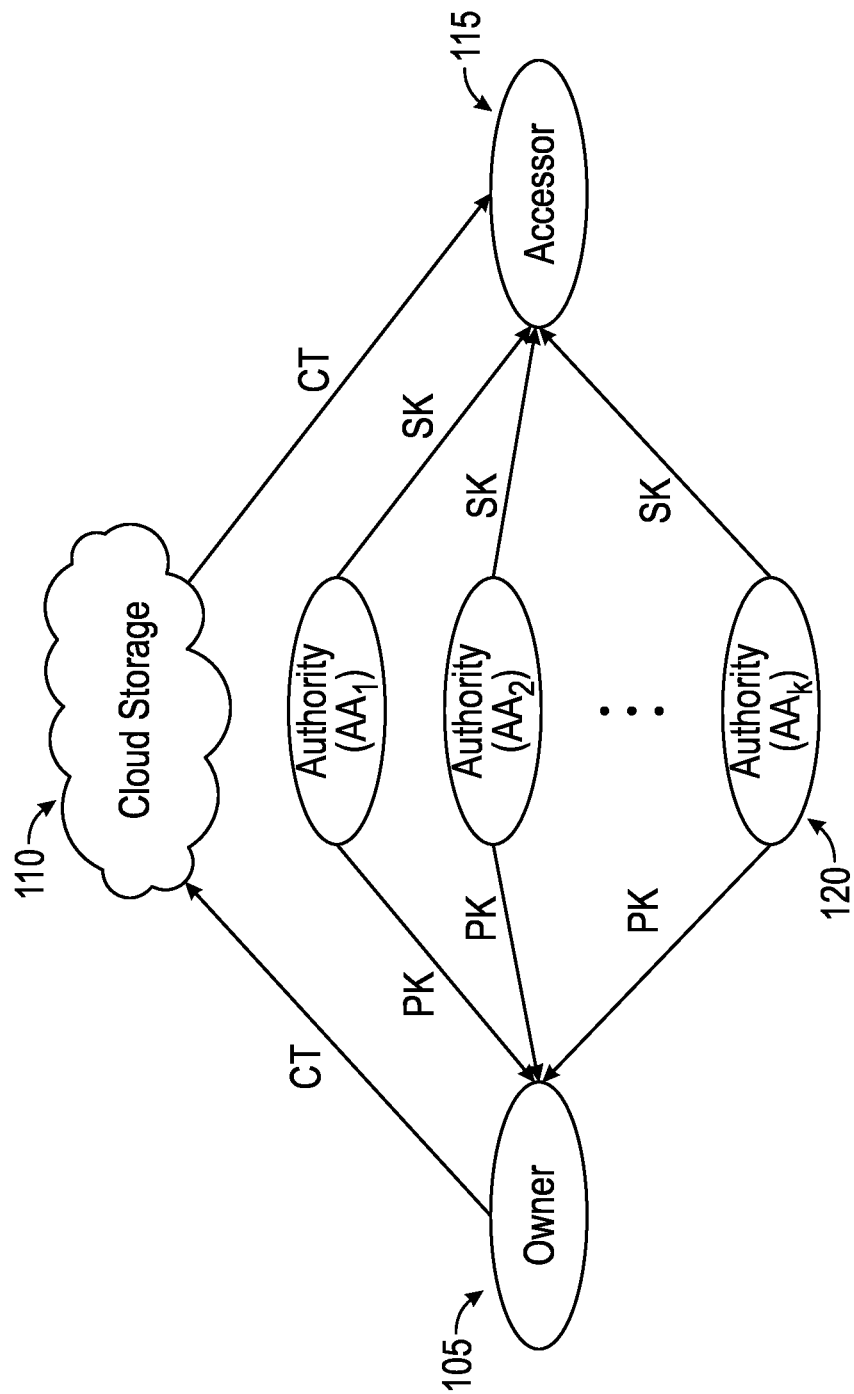
FIG. 1 illustrates an example system architecture for a decentralized multi-authority attribute-based encryption scheme.

In this work, we provide two new MA-ABIPFE constructions from bilinear maps supporting LSSS access policies in the significantly faster prime-order groups. Our schemes are secure under target-group-based computational assumptions which are known to be qualitatively weaker compared to the source-group-based ones. More precisely, the disclosed MA-ABIPFE schemes enjoy several salient features, namely, the disclosed schemes have significantly reduced communication and computation costs, a large universe of attributes can be added to the system without being enumerated at the time of setup, the one-use restriction is avoided by allowing appearance of an attribute in the policies arbitrarily many times, and the security is based on target-group-based assumptions.

Small-Universe MA-ABIPFE from DBDH: We construct a small-universe MA-ABIPFE scheme where each authority can control a single (or a bounded number of) attribute(s), but any number of authorities can join the system at any point of time. Our scheme is proven secure under the decisional bilinear Diffie-Hellman (DBDH) assumption which is a very well-studied computational target-group-based assumption. Along the way, we also build a single authority ABIPFE scheme under the DBDH assumption. It is worth mentioning that previously known all group-based ABIPFE schemes are secure under source-group-based computational assumptions. Note that, classical ABE schemes have already been proven secure under the DBDH assumption. We emphasize that constructing MA-ABIPFE is more challenging than MA-ABE since MA-ABIPFE provides richer functionality and stronger security as discussed earlier. In particular, we handle more powerful adversaries who is allowed to query secret keys that can decrypt the challenge ciphertext in contrast to only non-decryptable key queries allowed in case of MA-ABE. The key queries for a vector y and a set of attributes satisfying the challenge policy must ensure that $x_0 \cdot y = x_1 \cdot y$ where $(x_0, x_1)$ are the pair of challenge message vectors. On another note, our MA-ABIPFE scheme exhibits the possibility of building a primitive with richer functionality than MA-ABE based on the DBDH assumption.

Large-Universe MA-ABIPFE from L-DBDH: Inspired from the large-universe MA-ABE of prior work, we construct the first MA-ABIPFE scheme that supports large attribute universe and allows each authority to control any number of attributes. Just like previous large-universe MA-ABE scheme of prior work, we prove the security of our scheme under a parameterized version of the DBDH assumption which we call the L-DBDH assumption. We show the validity of this new assumption in the generic bilinear group model. Note that, all widely known pairing-based computational assumptions such as DDH, DBDH, k-Lin, so on are justified only in the generic group model. Our disclosed large-universe scheme is well comparable to the small-universe one with respect to computational and communication aspects of efficiency.

Static Security and Our Motivation: Our MA-ABIPFE schemes are proven secure in the random oracle model (ROM) in the static security model adapted to the MA-ABIPFE setting, where the adversary must declare all the challenge ciphertext, secret key, and authority corruption queries upfront. We emphasize that all previous constructions of MA-ABE from concrete assumptions are in ROM. Prior work proved security of their MA-ABIPFE in a slightly stronger model where only the secret keys can be queried adaptively but all the other queries must be submitted upfront. Their proof uses dual system encryption in composite-order groups to rely on variants of subgroup decision (and thus, source group) assumptions. On the contrary, our motivation is to build MA-ABIPFE schemes from weaker target group assumptions, while supporting the large universe feature additionally.

Although the static security may not be the dream security model for MA-ABIPFE, our motivation is to build the primitive with greater performance and versatility. It is often observed that schemes with better performance but weaker security are more suitable in various practical deployments. Further, weaker security notions have often been a major stepping stone towards a more advanced security, e.g., adaptive security, for the same primitive. In this context, it is worth mentioning that we could not find any vulnerability of our schemes against stronger adversaries, e.g., selective adversaries as considered in prior work, even though we are not able to mathematically prove its security based on the computational assumptions we considered in this paper. Please note that many primitives of prior works were first built only with selective/static security before being upgraded to adaptive security based on the same assumptions. Moreover, from a sustainability point of view, it is always important to have a portfolio of candidates for a primitive under various computational assumptions so that if one of the assumptions gets broken, candidates under a different assumption can be deployed. Another motivation for designing a DBDH or related assumption-based scheme is to innovate new techniques that could possibly be translated to the LWE setting, as has previously been done for other FE primitives.

Efficiency Analysis: We compare the efficiency metrics for our MA-ABIPFEs with that of prior work. The efficiency of our scheme is boosted significantly due to the use of prime-order groups. This improvement crucially stems from two aspects: (1) for the same security level (e.g., 128-bit), the groups of prime-order (e.g., with bit-length $\log_2 q=256$) are significantly smaller than that of the composite-order ones (e.g., with bit-length $\log_2 N=3072$), and (2) time to compute pairings (e.g., $P_q=5.05$ ms) and exponentiation (e.g., $E_{q,T}=108$ ms) in prime-order groups are significantly smaller than that of (e.g., $P_N=1270$ ms and $E_{N,T}=204$ ms respectively) in composite-order groups. This manifests in terms of the public key and ciphertext sizes, and the run-times of encryption and decryption algorithms.

2 Preliminaries

We will denote the underlying security parameter by $\lambda$ throughout the paper. A function negl: $\mathbb{N} \to \mathbb{R}$ is said to be a negligible function of $\lambda$, if for every $c \in \mathbb{N}$, there exists a $\lambda_c \in \mathbb{N}$ such that $\forall \lambda > \lambda_c$, $\text{negl}(\lambda) < \lambda^{-c}$. We denote the set of positive integers $\{1, \ldots, n\}$ as $[n]$. We use the abbreviation PPT for probabilistic polynomial-time. For a set X, we write $x \leftarrow X$ to denote that x is sampled according to the uniform distribution over the elements of X. Also for any set X, we denote by $|X|$ and $2^X$ the cardinality and the power set of the set X respectively. We use bold lower case letters, such as v, to denote vectors and upper-case, such as M, for matrices. We assume all vectors, by default, are row vectors. The $i^{th}$ row of a matrix is denoted by $M_i$ and analogously for a set of row indices I, we denote $M_I$ for the sub-matrix of M that consists of the rows $M_i$, $\forall_i \in I$. By rowspan (M), we denote the linear span of the rows of a matrix M.

For an integer $q \geq 2$, we let $\mathbb{Z}_q$ denote the ring of integers modulo q. We represent $\mathbb{Z}_q$ as integers in the range $(-q/2, q/2]$. The set of matrices of size m×n with elements in $\mathbb{Z}_q$ is denoted by $\mathbb{Z}_q^{m \times n}$. The operation $(\cdot)^T$ denotes the transpose of vectors/matrices. Let $u=(u_1, \ldots, u_n)$, $v=(v_1, \ldots, v_n) \in \mathbb{Z}_q^n$, then the inner product between the vectors is denoted as $v \cdot u = u^T u = \Sigma_{i \in [n]} u_i v_i \in \mathbb{Z}_q$. Moreover, we denote $v \odot u = (v_1 u_1, \ldots, v_n u_n n)$, i.e., a vector whose elements are component-wise product of the corresponding elements in v and u.

2.1 Pairing Groups

Assume a pairing group generator algorithm $\mathcal{G}$ that takes as input $1^\lambda$ and outputs a tuple $G=(q, \mathbb{G}, \mathbb{G}_T, g, e)$, where $\mathbb{G}$ is a group of prime order $q=q(\lambda)$ with generator g. The map $e: \mathbb{G} \times \mathbb{G} \to \mathbb{G}_T$ satisfies the following properties:

Bilinearity: $\forall a, b \in \mathbb{Z}_q$, $e(g^a, g^b) = e(g, g)^{ab}$.
Non-degeneracy: $e(g, g) = g_T$ generates $\mathbb{G}_T$.
For any $a \in \mathbb{Z}_q$, we define $[[a]] := g^a \in \mathbb{G}$ and $[[a]]_T := g_T^a \in \mathbb{G}_T$.

2.2 Complexity Assumptions

We use pairing groups of prime order to build our MA-ABIPFE schemes. Section 2.1 provides the standard notations for bilinear maps that we will use throughout the paper.

Assumption 1 (Decisional Bilinear Diffie-Hellman (DBDH) For a security parameter $\lambda \in \mathbb{N}$, , let $G=(q, \mathbb{G}, \mathbb{G}_T, g, e) \leftarrow \mathcal{G}(1^\lambda)$ be a bilinear group and let a, b, c $\leftarrow \mathbb{Z}_q$. The DBDH assumption states that for any PPT adversary $\mathcal{A}$, there exists a negligible function negl such that for any security parameter $\lambda \in \mathbb{N}$, given the distribution $\mathcal{D} = (G, [[a]], [[b]], [[c]], [[\tau]]_T)$, $\mathcal{A}$, has advantage $\mathrm{Adv}\mathcal{A}, ^{DBDH}(\lambda) = |Pr[1 \leftarrow \mathcal{A}, (1^\lambda, \mathcal{D}, [[abc]]_T)] -$
$Pr[\leftarrow \mathcal{A}, (1^\lambda, \mathcal{D}, [[\tau]]_T)]| \leq \mathrm{negl}(\lambda)$, Assumption 2 (L-Decisional Bilinear Diffie-Hellman (DBDH) For a security parameter $\lambda \in \mathbb{N}$, let $G=(q, \mathbb{G}, \mathbb{G}^T, g, e) \leftarrow \mathcal{G}(1^\lambda)$ be a bilinear group and let a, b, c $\leftarrow \mathbb{Z}_w$. The DBDH assumption states that for any PPT adversary $\mathcal{A}$, , there exists a negligible function negl such that for any security parameter $\lambda \in \mathbb{N}$, given the distribution $\mathcal{D} = (G, [[x]], [[y]], [[z]], \{[[\mu_i]], [[x\mu_i]], [[y\mu_i]], [[z/\mu_i]]\}_{i \in [L]}, \{[[z\mu_j/\mu_i]], [[x z \mu_j/\mu_i]]\}_{i,j \in [L], i \neq j})$, $\mathcal{A}$, has advantage $\mathrm{ADV}\mathcal{A}, ^{L-DBDH}(\lambda) = |Pr[1 \leftarrow \mathcal{A}, (1^\lambda, \mathcal{D}, [abc]_T)] - Pr[1 \leftarrow \mathcal{A}, (1^\lambda, \mathcal{D}, [\tau]_T)]| \leq \mathrm{negl}(\lambda)$.

2.3 Access Structures and Linear Secret Sharing Schemes

In this subsection, we present the formal definitions of access structures and linear secret-sharing schemes.

Definition 1 (Access Structures) Let $\mathcal{AU}$ be the attribute universe. An access structure on $\mathcal{AU}$ is a collection $\mathbb{A} \subseteq 2^{\mathcal{AU} \setminus \emptyset}$ of non-empty sets of attributes. The sets in $\mathbb{A}$ are called the authorized sets and the sets not in $\mathbb{A}$ are called the unauthorized sets. An access structure is called monotone if $\forall B, C \in 2^{\mathcal{AU}}$ if $B \in \mathbb{A}$ and $B \subseteq C$, then $C \in \mathbb{A}$.

Definition 2 (Linear Secret Sharing Schemes (LSSS)) Let $q=q(\lambda)$ be a prime and $\mathcal{AU}$ the attribute universe. A secret sharing scheme $\Pi$ with domain of secrets $\mathbb{Z}_q$ for a monotone access structure $\mathbb{A}$ over $\mathcal{AU}$, a.k.a. a monotone secret sharing scheme, is a randomized algorithm that on input a secret $z \in \mathbb{Z}_q$ outputs $|\mathcal{AU}|$ shares $sh_1, \ldots, sh_{|\mathcal{AU}|}$ such that for any set $S \in \mathbb{A}$ the shares $\{sh_i\}_{i \in S}$ determine z and other sets of shares are independent of z (as random variables). A secret-sharing scheme $\Pi$ realizing monotone access structures on $\mathcal{AU}$ is linear over $\mathbb{Z}_q$ if 1. The shares of a secret $z \in \mathbb{Z}_q$, for each attribute in $\mathcal{AU}$ form a vector over $\mathbb{Z}_q$.
2. For each monotone access structure $\mathbb{A}$ on $\mathcal{AU}$, there exists a matrix $M \in \mathbb{Z}_q^{l \times s}$, called the share-generating matrix, and a function $p: [e] \to \mathcal{AU}$, that labels the rows of M with attributes from $\mathcal{AU}$ which satisfy the following: During the generation of the shares, we consider the vector $v=(z, r_2, \ldots, r_s)$, where $r_2, \ldots, r_s \leftarrow \mathbb{Z}_q$. Then the vector of l shares of the secret z according to $\Pi$ is given by $\mu = Mv^T \in \mathbb{Z}_q^{l \times 1}$, where for all $j \in [l]$ the share $\mu_j$ "belongs" to the attribute $\rho(j)$. We will be referring to the pair (M, $\rho$) as the LOSS policy of the access structure $\mathbb{A}$.

The correctness and security of a monotone LSSS are formalized in the following: Let S (resp. S') denote an authorized (resp. unauthorized) set of attributes according to some monotone access structure $\mathbb{A}$ and let I (resp. I') be the set of rows of the share generating matrix M of the LSSS policy pair (M, $\rho$) associated with $\mathbb{A}$ whose labels are in S (resp. S'). For correctness, there exist constants $\{w_i\}_{i \in I}$ in $\mathbb{Z}_q$ such that for any valid shares $\{\mu_i = (Mv^T)_i\}_{i \in I}$ of a secret $z \in \mathbb{Z}_q$ according to $\Pi$, it is true that $\Sigma_{i \in I} w_i \mu_i = z$ (equivalently, $$\sum_{i \in I} w_i M_i = \left(1, \overbrace{0, \ldots, 0}^{s-1}\right),$$

where $M_i$ is the ith row of M). For soundness, there are no such $w_i$'s, as above. Additionally, we have that $\exists d \in \mathbb{Z}_q^{1 \times s}$, such that its first component $d_1 = 1$ and $M_i \cdot d = 0$, $\forall i \in I'$.

Remark 1 (NC[1] and Monotone LSSS) Consider an access structure $\mathbb{A}$ described by an NC[1] circuit. There is a folklore transformation that can convert this circuit by a Boolean formula of logarithmic depth that consists of (fan-in 2) AND, OR, and (fan-in 1) NOT gates. We can further push the NOT gates to the leaves using De Morgan laws, and assume that internal nodes only constitute of OR and AND gates and leaves are labeled either by attributes or their negations. In other words, we can represent any NC[1] policy over a set of attributes into one described by a monotone Boolean formula of logarithmic depth over the same attributes and their negations. Lewko and Waters presented a monotone LSSS for access structures described by monotone Boolean formulas. This implies that any NC[1] access policy can be captured by a monotone LSSS. Therefore, in this paper, we will only focus on designing an MA-ABIPFE scheme for monotone LSSS similar to the MA-ABE scheme of Datta et al.

We will use the following information theoretic property of LSSS access policies in the security proof of our MA-ABIPFE scheme. Recently, Datta, Komargodski, and Waters observed a gap in the proof of Rouselakis and Waters and presented a corrected proof. The security reduction of the MA-ABE scheme of Datta, Komargodski, and Waters crucially utilize this lemma to isolate an unauthorized set of rows of the challenge LSSS matrix submitted by the adversary and essentially ignore it throughout the security reduction. Like these papers, in our case as well, the rows of the challenge LSSS matrix corresponding to the corrupt authorities will constitute the unauthorized set in the application of the lemma.

Lemma 1 Let (M, $\rho$) be an LSSS access policy, where $M \in \mathbb{Z}_q^{l \times s}$. Let $C \in [l]$ be a non-authorized subset of row indices of M. Let $c \in \mathbb{N}$ be the dimension of the subspace spanned by the rows of M corresponding to indices in C. Then, there exists an access policy (M', ρ) such that the following holds:

The matrix $M'=(M'_{i,j})_{l \times s} \in \mathbb{Z}_q^{l \times s}$ satisfies $M'_{i,j}=0$ for all $(i,j)=C \times [s-c]$.

For any subset $S \in [l]$, if the rows of M having indices in S are linearly independent, then so are the rows of M' with indices in S.

The distribution of shares $\{\mu_x\}_{x \in [l]}$ sharing a secret $z \in \mathbb{Z}_z$ generated with the matrix M is the same as the distribution of the shares $\{\mu'_x\}_{x \in [l]}$ sharing the same secret z generated with the matrix M'.

2.4 Decentralized MA-ABIPFE for LSSS

A (large universe) decentralized multi-authority attribute-based inner-product functional encryption (MA-ABIPFE) scheme MA-ABIPFE=(GlobalSetup, LocalSetup, KeyGen, Encrypt, Decrypt) for access structures captured by linear secret sharing schemes (LSSS) over some finite field $\mathbb{Z}_q$ with $q=q(\lambda)$ and inner product message space $\mathcal{U} = \{\mathcal{U}_n\}_{n \in \mathbb{N}}$ consists of five algorithms with the following syntax. We denote by $\mathcal{AU}$ the authority universe and by $\mathcal{GID}$. the universe of users' global identifiers in the system. The attribute universe is denoted as $U_{att}$ which may be arbitrary. Further, an authority $\theta \in \mathcal{AU}$ may have any arbitrary number of attributes from $U_{att}$ under its control. We assume a publicly computable function $T:U_{att} \to \mathcal{AU}$ that maps each attribute $t \in U_{att}$ to a unique authority $\theta=T(t)$. The algorithm proceeds as follows:

GlobalSetup($^\lambda$, $1^n$): It is the global setup algorithm which on input the security parameter λ and a vector length n in unary, outputs the global public parameters GP. We assume that GP includes the descriptions of n, $\mathcal{AU}$ and $\mathcal{GID}$..

LocalSetup(GP, θ): The authority $\theta \in \mathcal{AU}$ runs the local setup algorithm during its initialization with the global parameters GP and generates its public parameters and a master secret key pair $(PK_\theta, MSK_\theta)$.

KeyGen(GP, GID, $MSK_\theta$, t, u): The key generation algorithm takes input the global parameter GP, a user's global identifier $GID \in \mathcal{GID}$, a master secret key $MSK_\theta$ for authority θ controlling an attribute $t \in U_{att}$, and a vector $u \in \mathbb{Z}_q^n$. It outputs a secret key $SK_{GID,t,u}$.

Encrypt(GP, (M, ρ), $\{PK_\theta\}_\theta$, v): The encryption algorithm takes input the global parameter GP, an LSSS access structure (M, δ) where M is a matrix over $\mathbb{Z}_q$ and δ is a row-labelling function that assigns to each row of M an attribute in $U_{att}$. We define the function $\rho:[l] \to \mathcal{AU}$ as $\rho(\bullet):=T(\delta(\bullet))$ which maps row indices of M to authorities $\theta \in \mathcal{AU}$. Accordingly, the encryption algorithm further takes a set $\{PK_\theta\}_\theta$ of public keys for all the authorities in the range of ρ, and a message vector $v \in \mathbb{Z}_q^n$. It outputs a ciphertext CT. We assume that CT implicitly contains the description of (M, δ).

Decrypt(GP, GID, CT, $\{SK_{GID,t,u}\}_t$): The decryption algorithm takes in the global parameters GP, a ciphertext CT generated with respect to some LSSS access policy (M, δ), and a collection of keys $\{SK_{GID,t,u}\}_t$ corresponding to user ID-attribute pairs $(GID, S \subseteq U_{att})$ and a key vector u possessed by a user with global identifier GID. It outputs a message ζ when the collection of attributes associated with the secret keys $\{SK_{GID,t,u}\}_t$ satisfies the LSSS access policy (M, δ), i.e., when the vector (1, 0, . . . , 0) belongs to the linear span of those rows of M which are mapped by ρ to the set of attributes in S that corresponds to the secret keys $\{SK_{GID,t,u}\}_{t \in S}$ possessed by the user with global identifier GID. Otherwise, decryption returns ⊥.

Correctness: An MA-ABIPFE scheme for LSSS-realizable access structures and inner product message space $\mathcal{U}_n$ is said to be correct if for every $\lambda \in \mathbb{N}$, every message vector $v \in \mathbb{Z}_q^n$, key vector $u \in \mathbb{Z}_q^n$, and $GID \in \mathcal{GID}$., every LSSS access policy (M, δ), and every subset of authorities $S \subseteq U_{att}$ controlling attributes which satisfy the access structure it holds that $$Pr\left[\zeta = v \cdot u \left| \begin{array}{l} GP \leftarrow \text{GlobalSetup}(1^\lambda, 1^n), \\ (PK_\theta, MSK_\theta) \leftarrow \text{LocalSetup}(GP, \theta), \\ SK_{GID,t,u} \leftarrow \text{KeyGen}(GP, GID, MSK_\theta, t, u), \\ CT \leftarrow \text{Encrypt}(GP, (M, \delta), \{PK_\theta\}_\theta, v), \\ \zeta = \text{Decrypt}(GP, CT, \{SK_{GID,t,u}\}_{t \in S}) \end{array} \right. \right] = 1.$$

Static Security: We consider static security for our MA-ABIPFE schemes formalized by the following game between a challenger and an adversary. The adversary is allowed to corrupt any desired set of authorities chosen after seeing the global public parameters. Once chosen, this set is fixed during the security experiment. The adversary also submits a pair of challenge message vectors $(v_0, v_1)$ after seeing the global public parameters. We emphasize that our security model allows the adversary to ask for secret keys which are capable of decrypting the challenge ciphertext.

Global Setup: The challenger runs GlobalSetup($1^\lambda$, $1^n$) to get and send the global public parameters GP to the attacker.

Adversary's Queries: The adversary sends the following queries:
1. A list $\mathcal{C} \subset \mathcal{AU}$ of corrupt authorities and their respective public parameters $\{PK_\theta\}_{\theta \in \mathcal{C}}$, which it might have created in a malicious way.
2. A set $\mathcal{N} \subset \mathcal{AU}$ of non-corrupt authorities, i.e., $\mathcal{C} \cap \mathcal{N} = \phi$, for which the adversary requests the public keys.
3. For any $u_k \in \mathbb{Z}_q^n$, a set $\mathcal{Q}_{u_k} = \{(GID_k, S_k, u_k)\}_{k \in [m]}$ of secret key queries, where each $GID_k \in \mathcal{GID}$ is distinct and each $S_k \subset U_{att}$ such that $T(S_k) \cap \mathcal{C} = \emptyset$, for all tuples $k \in [m]$. Let $\mathcal{Q} = \cup_{k \in [m]} \mathcal{Q}_{u_k}$ be the union of all such $\mathcal{Q}_{u_k}$.
4. Two message vectors $v_0, v_1 \in \mathbb{Z}_q^n$, and a challenge LSSS access policy (M, δ) with $\rho(\bullet)=T(\delta(\bullet))$ labelling each row of M with authorities in $(\mathcal{C} = \mathcal{N})$ and satisfying the constraint that for each $k \in [m]$, either the set $S_k \cup \cup_{\theta \in \mathcal{C}} T^{-1}(\theta)$ is an unauthorized set of the access matrix M or the secret key vector $u_k$ satisfies the relation $(v_0 - v_1) \cdot u_k = 0$.

Challenger's Replies: The challenger flips a random coin $\beta \leftarrow \{0,1\}$ and replies with the following:
1. The public keys $PK_\theta \leftarrow \text{LocalSetup}(GP, \theta)$ for all $\theta \in \mathcal{N}$.
2. The secret keys $SK_{GID,t,u} \leftarrow \text{KeyGen}(GP, GID_k, MSK_\theta, t, u_k)$ for all $(GID_k, S_k, u_k) \in \mathcal{Q}_{u_k} \subset \mathcal{Q}, t \in S_k$.
3. The challenge ciphertext $CT \leftarrow \text{Encrypt}(GP, (M, \delta), \{PK_\theta\}_{\theta \in \mathcal{C} \cup \mathcal{N}}, v_\beta)$.

Guess: The adversary outputs a guess β' for β.
The advantage of the adversary $\mathcal{A}$ is $\text{Adv}\mathcal{A}_{,SS-CPA}^{MA-ABIPFE}(\lambda) \triangleq |Pr[\beta=\beta']-1/2|$.

Definition 3 (Static Security for MA-ABIPFE for LSSS) An MA-ABIPFE scheme for LSSS-realizable access structures satisfies static security if for any PPT adversary $\mathcal{A}$ there exists negl(•) such that for all $\lambda \in \mathbb{N}$, we have $\text{Adv}\mathcal{A}_{,SS-CPA}^{MA-ABIPFE}(\lambda) \leq \text{negl}(\lambda)$.

Remark 2 (Static Security in the Random Oracle Model.) We additionally consider the aforementioned notion of selective security with static corruption in the ROM. In this context, we assume a global hash function H published as part of the global public parameters and accessible by all the parties in the system.

Remark 3 (On Small Universe MA-ABIPFE.) The above MA-ABIPFE definitions capture the large universe scenario by default. There are some minor changes with the definitions above when considering the case for a small universe scheme. In particular, we assume in this case w.l.o.g. that exactly one single attribute is assigned to a particular authority, and hence we use the words "authority" and "attribute" interchangeably. This leads to the following syntactic and semantic changes in the definitions:

1. There is a bijection between the attribute and authority universes.
2. LocalSetup(GP, $1^n$, t) outputs ($PK_t$, $MSK_t$) for an authority/attribute $t \in \mathcal{AU}$.
3. KeyGen(GP, GID, $MSK_t$, u) outputs $SK_{GID,t,u}$.
4. For an LSSS access structure (M, $\delta$), we have $\rho(\cdot) = \delta(\cdot)$ is an injective map.
5. The changes in the security definition follow accordingly.

3 Small Universe ABIPFE from DBDH

In this section, we describe the formal construction and proof for our ABIPFE scheme. The construction is in prime-order groups.

Setup($1^\lambda$, $s_{max}$, $1^n$, $U_{att}$): The setup algorithm takes input the security parameter $\lambda$, the maximum width of an LSSS matrix supported by the scheme $s_{max} = s_{max}(\lambda)$, the vector length n in unary and the description of the attribute universe $U_{att}$. It first generates $G = (q, \mathbb{G}, \mathbb{G}_T, g, e)$. Then for each attribute $t \in U_{att}$, it samples the vectors $\alpha_t, y_{t,2}, \ldots, y_{t,s_{max}} \leftarrow \mathbb{Z}_q^n$, and outputs $$PK = (G, \{[[\alpha_t]]_T, \{[[y_{t,j}]]\}_{j \in \{2, \ldots, s_{max}\}}\}_{t \in U_{att}}),$$
$$MSK = \{G, \{\alpha_t, \{y_{t,j}\}_{j \in \{2, \ldots, s_{max}\}}\}_{t \in U_{att}}\}$$

KeyGen(MSK, S, u): The key generation algorithm takes input master secret key MSK, a set of attributes $S \subseteq U_{att}$ and a vector $u \in \mathbb{Z}_q^n$. For each $t \in S$, it does the following:

1. For each $j \in \{2, \ldots, s_{max}\}$, compute $K_{t,j} = [[k_{t,j}]]$, where $k_{t,j} \leftarrow \mathbb{Z}_q$.
2. Compute $SK_{t,u} = [[\alpha_t \cdot u]] \prod_{j=2}^{s_{max}} K_{t,j}^{y_{t,j} \cdot u}$.

Output $SK_{S,u} = (u, \{SK_{t,u}, \{K_{t,j}\}_{j \in \{2, \ldots, s_{max}\}}\}_{t \in S})$ as the secret key.

Encrypt(PK, (M, $\rho$), v): The encryption algorithm takes input the public key PK, an LSSS access structure (M,$\rho$) where $M = (M_1, \ldots, M_l)^T \in \mathbb{Z}_q^{l \times s_{max}}$ and $\rho:[l] \to U_{att}$, and a message vector $v \in \mathbb{Z}_q^n$. The function $\rho$ maps the row indices of M to attributes. We assume that $\rho$ is an injective function, that is, an attribute is associated with at most one row of M. The algorithm proceeds as follows:

1. Sample $\{r_i \leftarrow \mathbb{Z}_q\}_{i \in [l]}$, $z$, $b_2, \ldots, b_{s_{max}}$, $x_2, \ldots, x_{s_{max}} \leftarrow \mathbb{Z}_q^n$
2. Set the following matrices:

$$B = [z, b_2, \ldots, b_{s_{max}}]_{s_{max} \times n}^T, X = [x_2, x_3, \ldots, x_{s_{max}}]_{(s_{max}-1) \times n}$$

3. Compute the following terms:

$$C_0 = [[v+z]]_T, \quad C_{1,i} = [[M_i B + r_i \alpha_{\rho(i)}]]_T, \quad \forall i \in [l];$$

$$C_{2,i} = [[r_i]], \forall i \in [l]; \quad C_{3,i,j} = [[M_{i,j} x_j + r_i y_{\rho(i),j}]] \forall i \in [l], j \in \{2, \ldots, s_{max}\}$$

4. Output the ciphertext, CT=(M,$\rho$), $C_0$, $\{C_{1,i}, C_{2,i}, \{C_{3,i,j}\}_{j \in \{2, \ldots, s_{max}\}}\}_{i \in [l]}$).

Decrypt(PK, $SK_{S,u}$, CT): The decryption algorithm takes input the public key PK, a secret key $SK_{S,u}$ for an attribute set $S \subseteq U_{att}$ and a vector $u \in \mathbb{Z}_q^n$ and a ciphertext CT for an access structure (M, $\rho$) with $M \in \mathbb{Z}_q^{l \times s_{max}}$ and an injective map $\rho:[l] \to U_{att}$.

Parse $SK_{S,u} = (u, \{SK_{\rho(i),u}, \{K_{\rho(i),j}\}_{j \in \{2, \ldots, s_{max}\}}\}_{\rho(i) \in S})$, where $i \in [l]$ and CT=((M, $\rho$), $C_0$, $\{C_{1,i}, C_{2,i}, \{C_{3,i,j}\}_{j \in \{2, \ldots, s_{max}\}}\}_{i \in [l]}$). Denote $I = \{i | \rho(i) \in S\} \subseteq [l]$. If (1, 0, ..., 0) is not in the span of $M_I$ (i.e., M restricted to the set of rows from I), decryption fails. Else, when S satisfies (M, $\rho$), the algorithm finds $\{w_i \in \mathbb{Z}_q\}_{i \in I}$ such that (1, 0, ..., 0) = $\Sigma_{i \in I} w_i M_i$. It then computes $$[[\zeta]]_T = C_0 \cdot u \cdot \left( \prod_{i \in I} \left[ \frac{C_{1,i} \cdot u \cdot \prod_{j=2}^{s_{max}} e(K_{\rho(i),j}, C_{3,i,j} \cdot u)}{e(SK_{\rho(i)}, C_{2,i})} \right]^{w_i} \right)^{-1}$$

and outputs $\log_{g_T}([[\zeta]]_T)$.

Theorem 1 If the DBDH assumption holds, then all PPT adversaries have a negligible advantage in breaking selective security of the proposed small universe ABIPFE scheme in the standard model.

4 Small Universe MA-ABIPFE from DBDH

In this section, we describe the formal construction for our MA-ABIPFE scheme. The construction is in prime-order groups and additionally uses a hash function that can be modelled as a random oracle in a security proof.

GlobalSetup($1^\lambda$, $s_{max}$, $1^n$): The global setup algorithm takes input the security parameter $\lambda$, the maximum width of an LSSS matrix supported by the scheme $s_{max} = s_{max}(\lambda)$ and the vector length n in unary. It generates $G = (q, \mathbb{G}, \mathbb{G}_T, g, e)$ and specify a hash function H: $\mathcal{GID} \times \mathbb{Z}^n \times [s_{max}] \to \mathbb{G}$ mapping strings (GID, u, j) $\in \mathcal{GID} \times \mathbb{Z}^n \times [s_{max}]$ to elements in $\mathbb{G}$. It outputs a global parameter GP=(n, G, H).

LocalSetup GP, t): The authority setup algorithm takes as input GP and an authority index/attribute $t \in \mathcal{AU}$. It samples vectors $\alpha_t, y_{t,2}, \ldots, y_{t,s_{max}} \leftarrow \mathbb{Z}_q^n$ and outputs $$PK_t = ([[\alpha_t]]_T, [[y_{t,2}]], \ldots, [[y_{t,s_{max}}]]), MSK_t = (\alpha_t, y_{t,2}, \ldots, y_{t,s_{max}})$$

KeyGen(GP, GID, $MSK_t$, u): The key generation algorithm takes input GP, the user's global identifier GID, the authority's secret key $MSK_t$ and a vector $u \in \mathbb{Z}_q^n$. It outputs $$SK_{GID,t,u} = [[\alpha_t \cdot u]] \prod_{j=2}^{s_{max}} H(GID || u || j)^{y_{t,j} \cdot u}.$$

Encrypt(GP, (M, $\rho$), $\{PK_t\}$, v): The encryption algorithm takes input the global parameter GP, an LSSS access structure (M, $\rho$) where $M = (M_1, \ldots, M_l)^T \in \mathbb{Z}_q^{l \times s_{max}}$ and $\rho:[l] \to \mathcal{AU}$, a set $\{PK_t\}$ of public keys for all the authorities in the range of $\rho$, and a message vector $v \in \mathbb{Z}_q^n$. The function maps the row indices of M to authorities or attributes. We assume $\rho$ is an injective function, that is, an authority/attribute is associated with at most one row of M. The algorithm proceeds as follows:

1. Sample $\{r_i \leftarrow \mathbb{Z}_q\}_{i \in [l]}$, $z$, $b_2, \ldots, b_{s_{max}}$, $x_2, \ldots, x_{s_{max}} \leftarrow \mathbb{Z}_q^n$ 2. Set the following matrices:

$$B=[z,b_2,\ldots,b_{s_{max}}]_{s_{max}\times n}^T, X=[x_2,x_3,\ldots,x_{s_{max}}]^T_{(s_{max}-1)\times n}$$

3. Compute the following terms:

$$C_0 = [\![v+z]\!]_T; C_{1,i} = [\![M_iB + r_i\alpha_{\rho(i)}]\!]_T, C_{2,i} = [\![r_i]\!], \forall\, i \in [\ell];$$

$$C_{3,i,j} = [\![M_{i,j}x_j + r_iy_{\rho(i),j}]\!], \forall\, i \in [\ell], j \in \{2, \ldots, s_{max}\}$$

and output the ciphertext, $$CT=(M,\rho),C_0,\{C_{1,i}\}_{i\in[\ell]},\{C_{2,i}\}_{i\in[\ell]},\{C_{3,i,j}\}_{i\in[\ell],j\in\{2,\ldots,s_{max}\}}).$$

Decrypt(GP, GID, CT, $\{SK_{GID,t,u}\}$): The decryption algorithm takes input the global parameter GP, a ciphertext CT for an access structure (M, $\rho$) with $M \in \mathbb{Z}_q^{l\times s_{max}}$ and $\rho:[l]\to \mathbb{U}$ injective, and the secret keys $\{SK_{GID,\rho(i),u}\}_{i\in I}$ corresponding to a global identity GID and a subset of rows of M with indices $I \subset [l]$. If $(1, 0, \ldots, 0)$ is not in the span of these rows, $M_I$, then decryption fails. Otherwise, the algorithm finds $\{w_i\}_{i\in I}$ such that $(1, 0, \ldots, 0)=\Sigma_{i\in I}w_iM_i$. The algorithm computes $$[\![\zeta]\!]_T = C_0 \cdot u \cdot \left(\prod_{i\in I}\left[\frac{C_{1,i}\cdot u \cdot \prod_{j=2}^{s_{max}} e(H(GID\|u\|j), C_{3,i,j}\cdot u)}{e(SK_{GID,\rho(i),u}, C_{2,i})}\right]^{w_i}\right)^{-1}$$

and outputs $\log_{g_T}([\![\zeta]\!]_T)$.

Theorem 2 If the DBDH assumption holds, then all PPT adversaries have a negligible advantage in breaking the static security of the proposed small universe MA-ABIPFE scheme in the random oracle model.

5 Large Universe MA-ABIPFE from L-DBDH

In this section, we describe the construction of our large universe MA-ABIPFE (LMA-ABIPFE) scheme. The construction is in prime-order groups and additionally uses hash functions that are modelled as random oracles in the security proof.

GlobalSetup($1^\lambda$, $1^n$, $s_{max}$): The global setup algorithm takes input the security parameter $\lambda$ and a vector length n both in unary, and the maximum width of an LSSS matrix supported by the scheme $s_{max}=s_{max}(\lambda)$. It generates G=(q, $\mathbb{G}$, $\mathbb{G}_T$, g, e) and specify hash functions H: $\mathcal{GID}\times\mathbb{Z}^n\times[s_{max}]\to\mathbb{G}$ mapping strings (GID, u, j) $\in \mathcal{GID}\times\mathbb{Z}^n\times[s_{max}]$ to elements in $\mathbb{G}$ and R: $\mathcal{U}\times[s_{max}]\to\mathbb{G}$ mapping strings (t, j) $\in \mathbb{U}\times[s_{max}]$ to elements in $\mathbb{G}$. It outputs a global parameter GP=(n, G, H, R).

LocalSetup(GP,$\theta$): The authority setup algorithm takes input the global parameter GP and an authority index $\theta \in \mathcal{AU}$. It samples vectors $\alpha_\theta, y_{\theta,2}, \ldots, y_{\theta,s_{max}} \leftarrow \mathbb{Z}_q^n$ and outputs $PK_\theta=([\![\alpha_\theta]\!]_T, [\![y_{\theta,2}]\!], \ldots, [\![y_{\theta,s_{max}}]\!])$ and $MSK_\theta=(\alpha_\theta, y_{\theta,2}, \ldots, y_{\theta,s_{max}})$.

KeyGen(GP, GID, $MSK_\theta$, t, u): The key generation algorithm takes input GP, the user's global identifier GID, the authority's secret key $MSK_\theta$, an attribute t controlled by the authority and a vector $u \in \mathbb{Z}_q^n$. It samples $\tau_j \leftarrow \mathbb{Z}_p$ for $j \in [s_{max}]$ and outputs $$SK_{GID,t,u} = \left(u, K_{GID,t}^{(0)} = [\![\alpha_\theta \cdot u]\!] \cdot \prod_{j=2}^{s_{max}} H(GID\|u\|j)^{y_{\theta,j}\cdot u} \cdot \prod_{j=1}^{s_{max}} R(t\|j)^{\tau_j},\right.$$

$$\left.\{K_{GID,t}^{(j)} = [\![\tau_j]\!]\}_{j\in[s_{max}]}\right)$$

Encrypt(GP, (M, $\delta$), $\{PK_\theta\}$, v): The encryption algorithm takes input the global parameter GP, an LSSS access structure (M, $\rho$) where $M=(M_1, \ldots, M_l)^T \in \mathbb{Z}_q^{l\times s_{max}}$ and $\delta:[l]\to \mathbb{U}$, a set $\{PK_\theta\}$ of public keys for all the relevant authorities, and a message vector $v \in \mathbb{Z}_q^n$. The function $\delta$ maps the row indices of M to attributes. We define the function $\rho:[l]\to \mathcal{AU}$ as $\rho(\cdot)=T(\delta(\cdot))$ which maps row indices of M to authorities. The algorithm proceeds as follows:

1. Sample $\{r_i \leftarrow \mathbb{Z}_q\}_{i\in[l]}, z, b_2, \ldots, b_{s_{max}}, x_2, \ldots, x_{s_{max}} \leftarrow \mathbb{Z}_q^n$
2. Set the following matrices:

$$B=[z,b_2,\ldots,b_{s_{max}}]_{s_{max}\times n}^T, X=[x_2,x_3,\ldots,x_{s_{max}}]^T_{(s_{max}-1)\times n}$$

3. Compute the following terms:

$$C_0=[\![v+z]\!]_T, C_{1,i}=[\![M_iB+r_i\alpha_{\rho(i)}]\!]_T, C_{2,i}=[\![r_i]\!], \forall i \in [l];$$

$$C_{3,i,j}=[\![M_{i,j}x_j+r_iy_{\rho(i),j}]\!]\forall i \in [l], j \in \{2,\ldots,s_{max}\};$$

$$C_{4,i,j}=R(\delta(i)\|j)^{r_i}\forall i \in [l], j \in [s_{max}]$$

and output the ciphertext $$CT=(M,\rho),C_0,\{C_{1,i}\}_{i\in[l]},\{C_{2,i}\}_{i\in[l]},\{C_{3,i,j}\}_{i\in[l],j\in\{2,\ldots,s_{max}\}},\{C_{4,i,j}\}_{i\in[l],j\in[s_{max}]}).$$

Decrypt(GP, GID, CT, $\{SK_{GID,t,u}\}$): The decryption algorithm takes input the global parameter GP, a ciphertext CT for an access structure (M,$\delta$) with $M \in \mathbb{Z}_q^{l\times s_{max}}$, and the secret keys $\{SK_{GID,\delta(i),u}=(u,K_{GID,\delta(i)}^{(0)}, \{K_{GID,\delta(i)}^{(j)}\}_{j\in[s_{max}]})\}_{i\in I}$ corresponding to a global identity GID and a subset of rows of M with indices $I \subset [l]$. If $(1, 0, \ldots, 0)$ is not in the span of these rows, $M_I$, then decryption fails. Otherwise, the algorithm finds $\{w_i\}_{i\in I}$ such that $(1, 0, \ldots, 0)=\Sigma_{i\in I}w_iM_i$. Finally, it outputs $\log_{g_T}([\![\zeta]\!]_T)$, where $$[\![\zeta]\!]_T =$$

$$C_0 \cdot u \cdot \left(\prod_{i\in I}\left[\frac{C_{1,i}\cdot u \cdot \prod_{j=2}^{s_{max}} e(H(GID\|u\|j), C_{3,i,j}\cdot u)\prod_{j=2}^{s_{max}} e(K_{GID,\delta(i)}^{(j)}, C_{4,i,j})}{e(K_{GID,\delta(i)}^{(0)}, C_{2,i})}\right]^{w_i}\right)^{-1}$$

Theorem 3 If the L-DBDH assumption holds, then all PPT adversaries have a negligible advantage in breaking the static security of the proposed LMA-ABIPFE scheme in the random oracle model.

System Implementations

With reference to FIG. 1, an example system architecture for a decentralized multi-authority attribute-based encryption scheme is illustrated. The Owner 105 of a message, such any arbitrary data, can encrypt the message as described herein and store the resulting ciphertext in a Cloud Storage 110. Another user, illustrated as Accessor 115, may retrieve this ciphertext from Cloud Storage 110. Multiple Authorities 120 may be instantiated for managing public and secret keys. The Authorities 120 may distribute private key to data Owner 105, and secret keys to Accessor 115. As described herein, the user can only decrypt the ciphertext if the user has at least the predetermined number of attributes from the requisite authorities.

Figure 2:
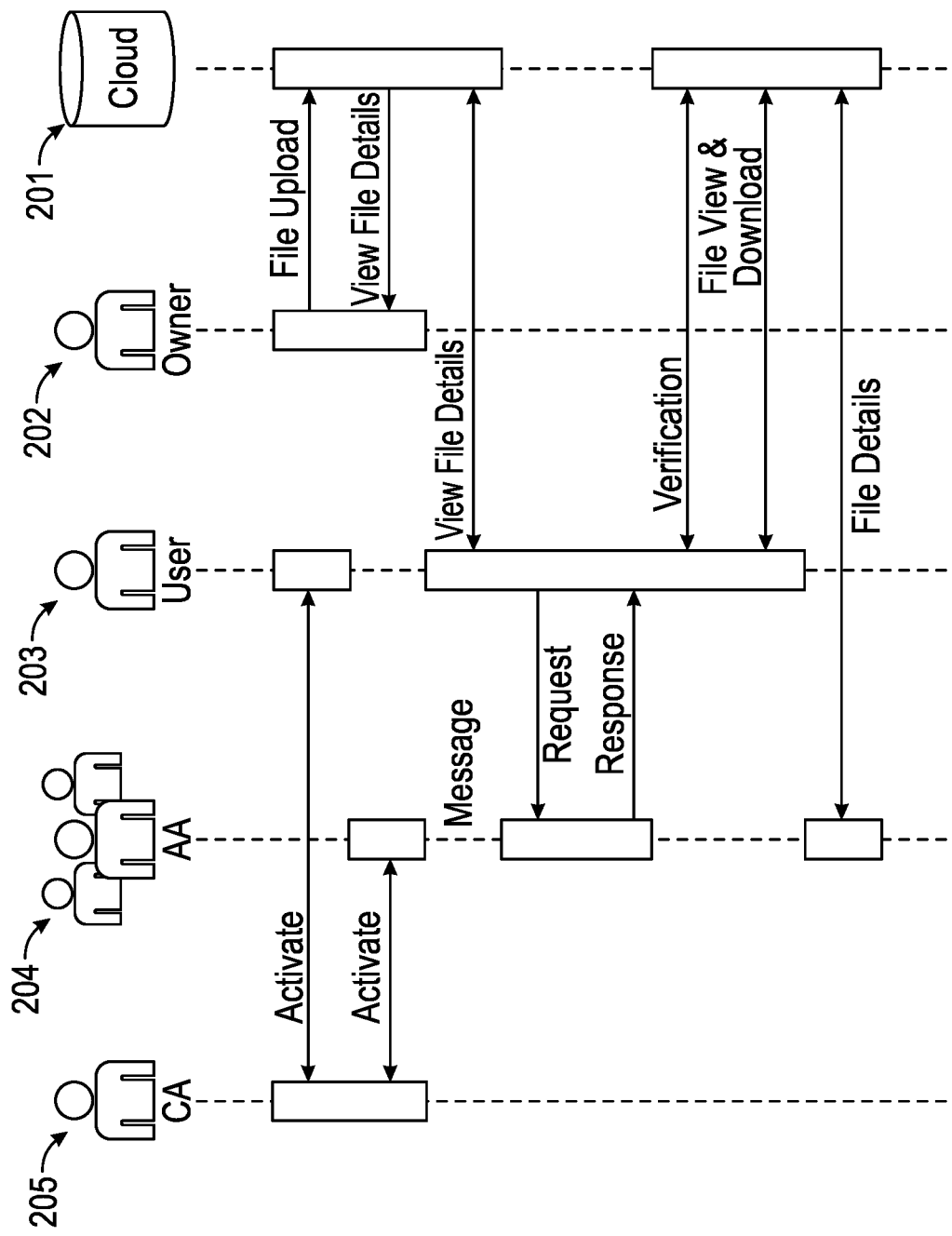
FIG. 2 illustrates an example sequence diagram for a decentralized multi-authority attribute-based encryption scheme.

With reference to FIG. 2, an example sequence diagram for a decentralized multi-authority attribute-based encryption scheme is illustrated. Arbitrary data may be stored in Cloud 201. Data Owner 202 may have caused the data to be uploaded to the cloud. Subsequently, User 203 may wish to obtain the data from the Cloud 201. User 203 may initially view file details and request a key from Authority 204. While only a single Authority 204 is illustrated here, multiple authorities can be instantiated and the user may be in communication with multiple of the authorities.

Figure 3:
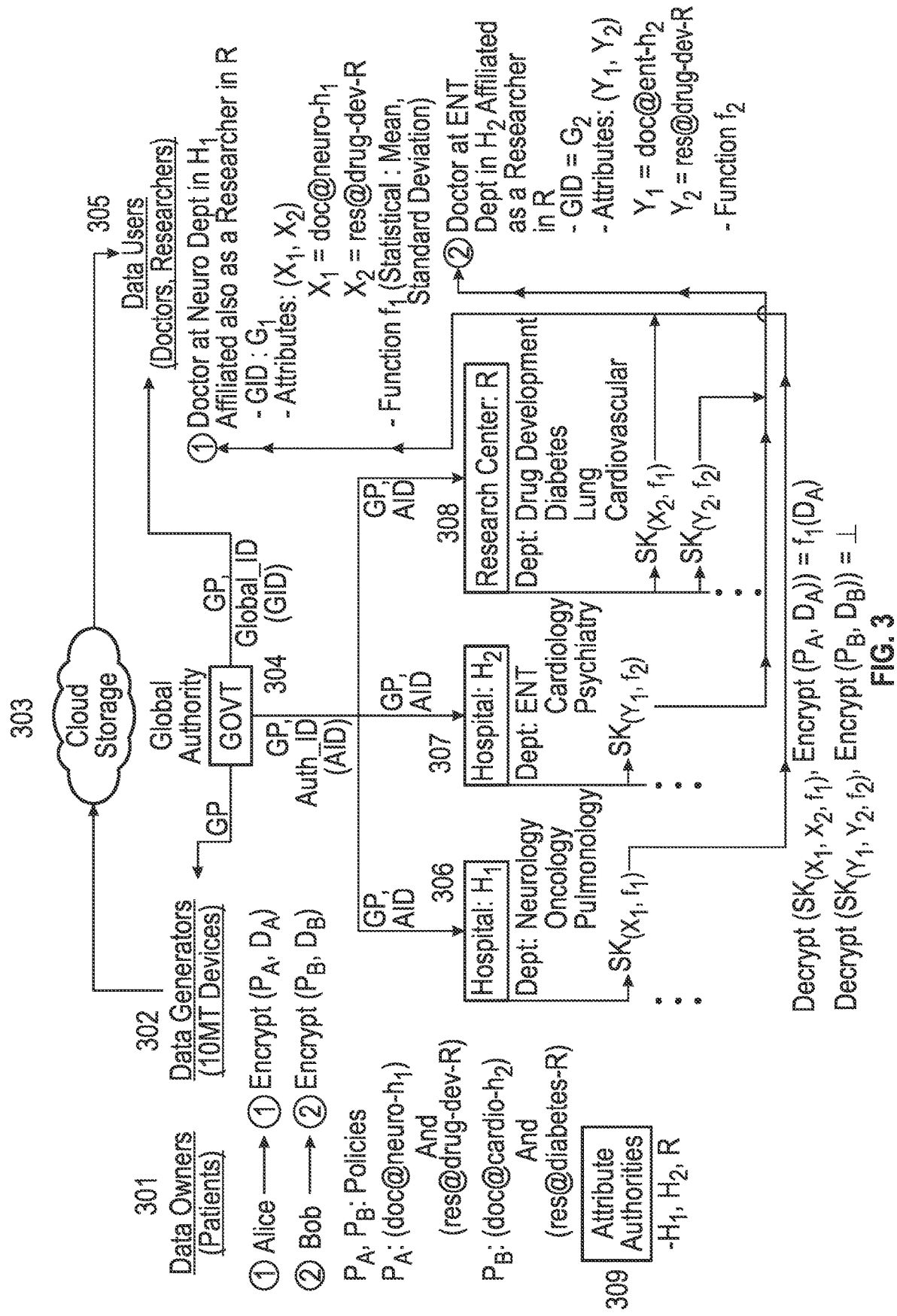
FIG. 3. illustrates an example system for securely performing calculations operating on private medical information.

As non-limiting examples, additional applications include finance, blockchain, and smart contracts. An Internet of Medical Things (IoMT) embodiment is illustrated in FIG. 3. FIG. 3 illustrates an example system for securely performing calculations operating on private medical information. As illustrated, data owners 301, such as patients, encrypt medical information according to global parameters provided by global authority 304, such as a governmental authority. The encrypted data may be transmitted or stored in a cloud storage 303 and delivered to data users 305. The global authority 304 provides global parameters to institutions, such as hospitals 306, 307, and 308. The global authority provides the global parameters and global id to data users 305, such as doctors or researchers. Secret keys associated with certain attributes and functions are provided to the data users 305 by the attribute authorities 309, enabling performance of the authorized calculations.

Figure 4:
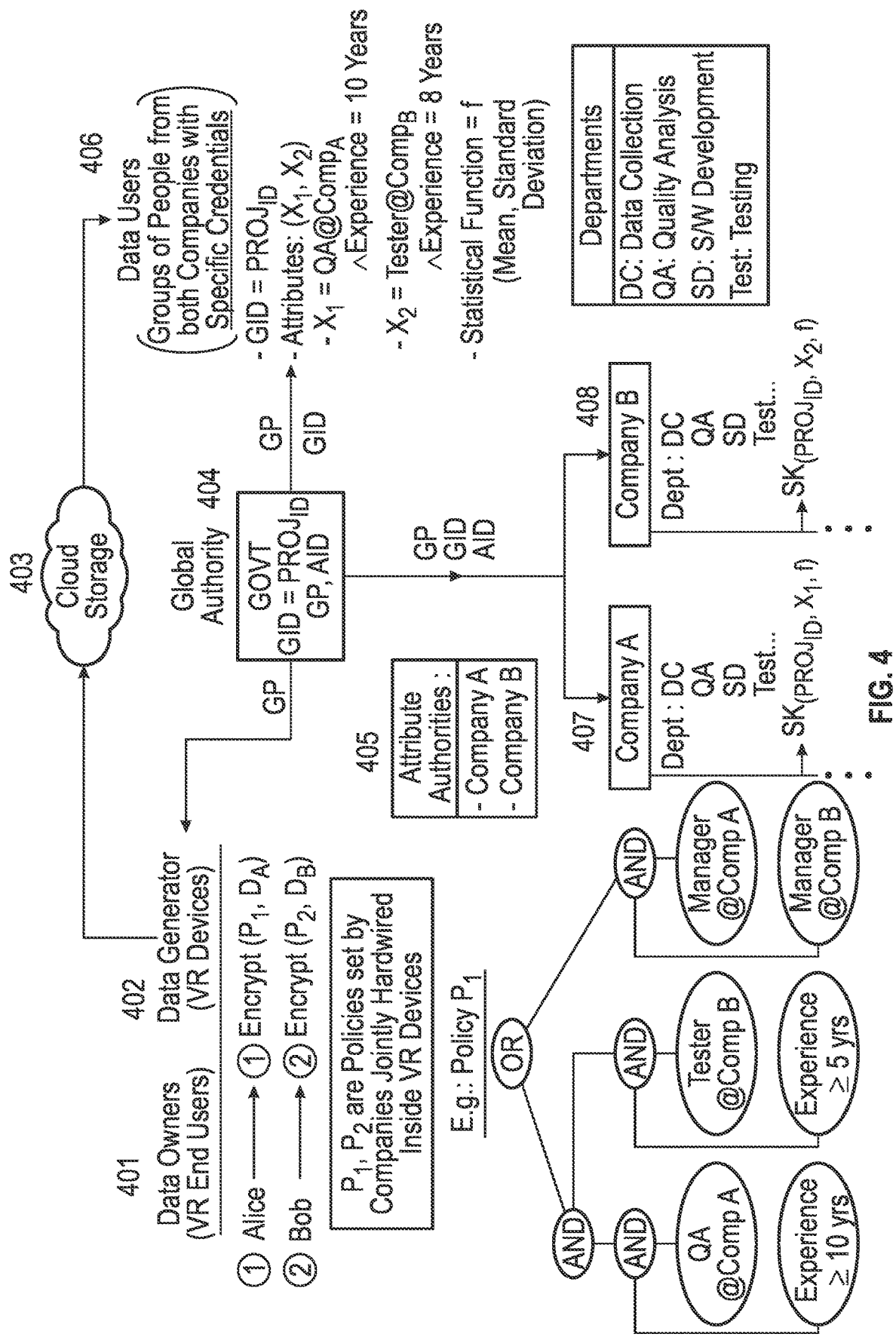
FIG. 4 illustrates an example system for securely performing calculations operating in a virtual reality context.

A privacy preserving mechanism in Virtual Reality (VR) and Augmented Reality (AR) embodiment is illustrated in FIG. 4. FIG. 4 illustrates an example system for securely performing calculations operating in a virtual reality context. As illustrated, data owners 401 and 402, such as virtual reality end users, encrypt device data information according to global parameters provided by global authority 404, such as a governmental authority. The encrypted data may be transmitted or stored in a cloud storage 403 and delivered to data users 406. The global authority 404 provides global parameters to companies, such as companies 407 and 408. The global authority provides the global parameters and global id to data users 406, such as researchers at the companies. Secret keys associated with certain attributes and functions are provided to the data users 406 by attribute authorities 405, enabling performance of the authorized calculations.

Augmented Reality: AR is an interactive experience of a real-world environment where the objects that reside in the real world are enhanced by computer-generated perceptual information, sometimes across multiple sensory modalities, including visual, auditory, haptic, somatosensory and olfactory. AR can be defined as a system that incorporates three basic features: a combination of real and virtual worlds, real-time interaction, and accurate 3D registration of virtual and real objects. This experience is seamlessly interwoven with the physical world such that it is perceived as an immersive aspect of the real environment. In this way, AR alters one's ongoing perception of a real-world environment.

Virtual Reality: By contrast, VR creates its own simulated environment, that may (or may not) be entirely different from the real world. VR is usually experienced through an interface, such as a headset or goggles, instead of watching content on a screen. Standard VR systems use either VR headsets or multi-projected environments to generate realistic images, sounds and other sensations that simulate a user's physical presence in a virtual environment. A person using VR equipment is able to look around the artificial world, move around in it, and interact with virtual features or items. VR typically incorporates auditory and video feedback, but may also allow other types of sensory and force feedback through haptic technology.

Both AR and VR embodiments can span an enormous number of application areas, including:
 1. Healthcare (e.g., training medical doctors in surgery)
 2. Education, Scientific visualization
 3. Armed forces (military training)
 4. Sports and Entertainment (e.g., video games)
 5. Flight training
 6. Industrial designs
 7. Navigation etc.
 8. Tourism (sight-seeing)

As is clear, its applications are going to grow only in all probability. VR and AR are transforming a lot of industries through software and hardware development, graphic design, research, and more. This has thus led to a massive number of job opportunities in the associated industry. In-demand careers developing and improving AR and VR technology include: software engineering and development, software maintenance, graphic design etc. With such a huge surge it its applicability, one of the primary concerns (if not the most important one) are that of privacy and security. For e.g., many VR systems involve features like finger tracking, eye tracking (among other things). Such features can actually lead to potential misuse of sensitive information victimizing the person using VR gadgets. Owing to its constructive applications in society, many front-line companies (e.g., Apple, Microsoft, Facebook) are now interested in it. There are also examples of companies that collaborate within themselves or with other agencies (e.g., European Space Agency) in order to develop more accurate and robust VR systems. Privacy-preserving techniques naturally has a great role to play in such endeavours.

Our application of MA-ABIPFE (and generally, MA-ABFE) is in such a scenario, where a particular section in the United States government needs VR technology for some dedicated purposes. This involves developing full-scale VR systems. Accordingly, the U.S. government fixes a global identifier for this project (say ProjID) and delegates its development and maintenance jointly to two companies CompanyA and CompanyB. Such distributed deployment of the sensitive VR system is necessary in order to prevent the individual companies from secretly storing any backdoors about the system in order to collect data which they are not intended to read. In other words, these two companies collaborate to build, test and maintain the VR platform jointly. For testing the accuracy of this system, they want to compute various statistics on large volumes of training data generated in real-time from end users who are willing to be volunteers from within or outside their organizations. In order to compute such collective data securely, CompanyA and CompanyB has employed people in their separate departments (e.g., Data Collection and Management, Quality Analysis, Testing, Software Development). The companies themselves are individual, independent authorities distributing secret keys to its respective employees corresponding to their attributes and certain (possibly statistical) functions under the same ProjID. The VR devices developed have policies embedded within them. These policies are decided jointly by the higher management of both the companies (comprising of the board of directors, CEOs etc.). Upon collecting data from end users in batches, the VR devices are programmed to encrypt them corresponding to their policies and upload it to a cloud server that is again jointly established by both the companies. The policies essentially dictate which employees with certain attributes from any of these companies can come together to pull a "joint" secret key in order to decrypt and learn functions of the encrypted data. Such a system would allow certain groups of employees from these companies holding individual authorized secret keys to come together and jointly learn only the intended functions of the original data. FIG. 4 further illustrates the schematics of this application.

Figure 5:
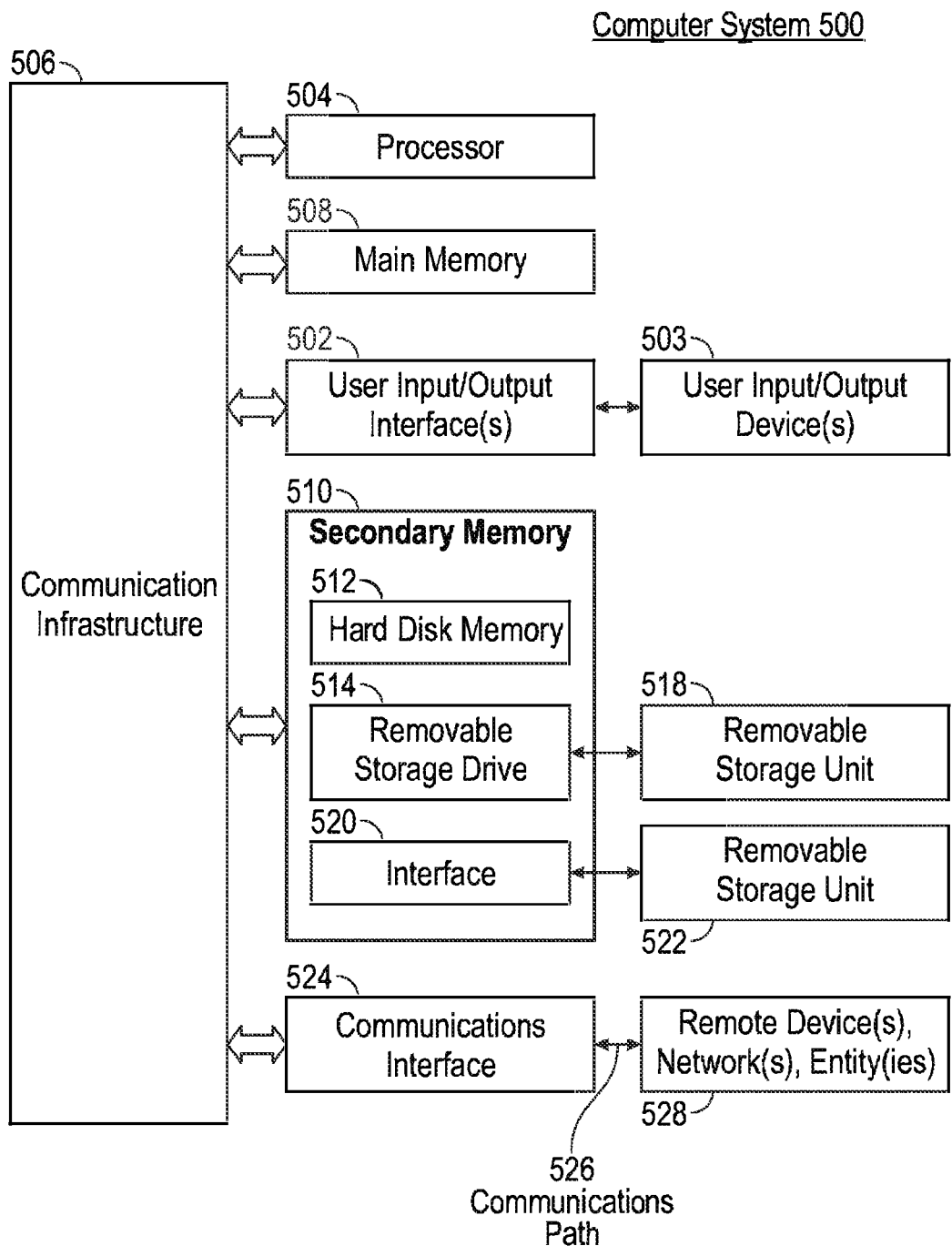
FIG. 5 illustrates an example computer system architecture for implementing the claimed systems and methods.
Figure 6:
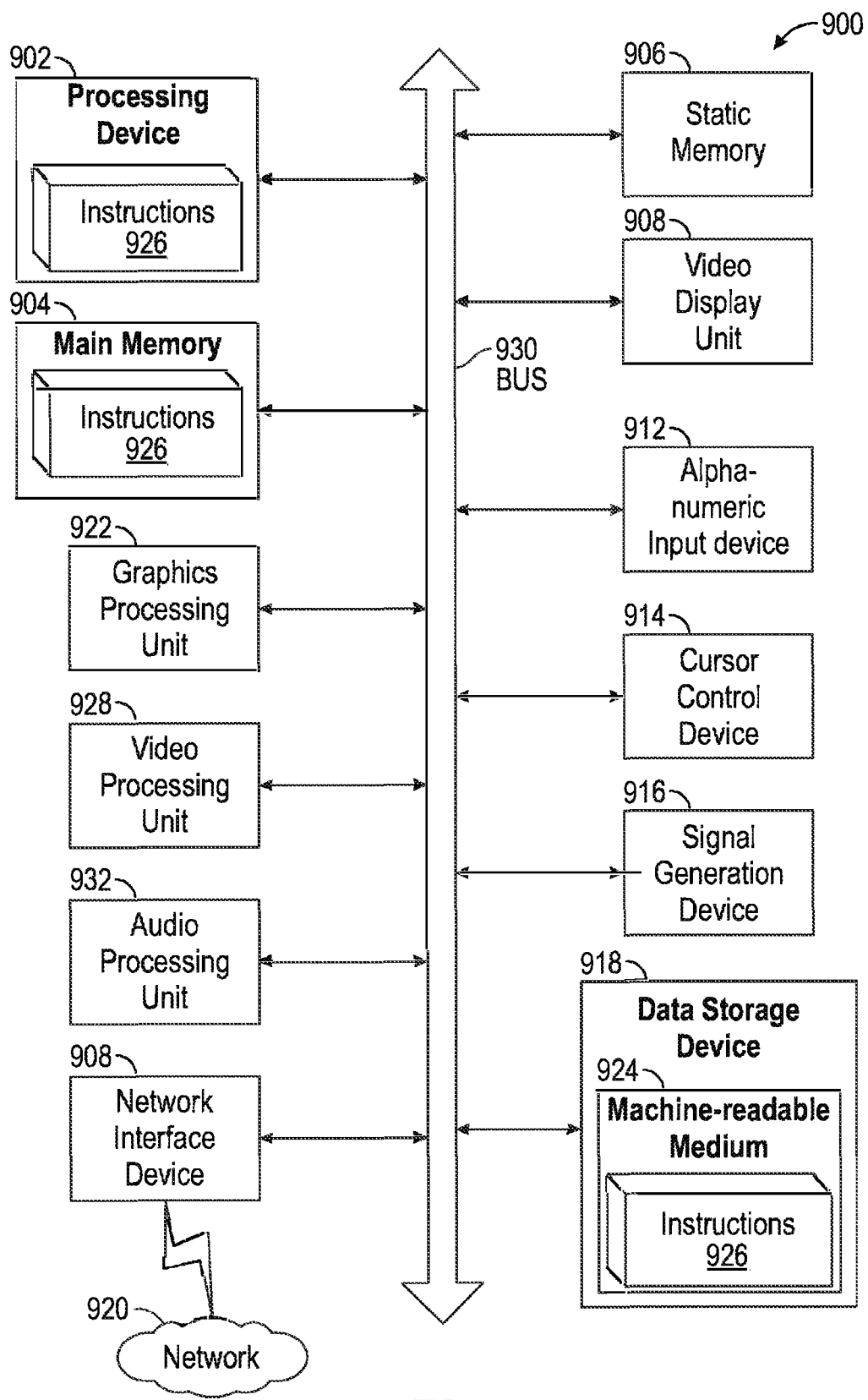
FIG. 6 illustrates further details of an example computer system architecture for implementing the claimed systems and methods.

FIGS. 5 and 6 depict example computer systems useful for implementing various embodiments described in the present disclosure. Various embodiments may be implemented, for example, using one or more computer systems, such as computer system 500 shown in FIG. 5. One or more computer system(s) 500 may be used, for example, to implement any of the embodiments discussed herein, as well as combinations and sub-combinations thereof.

Computer system 500 may include one or more processors (also called central processing units, processing devices, or CPUs), such as a processor 504. Processor 504 may be connected to a communication infrastructure 506 (e.g., such as a bus).

Computer system 500 may also include user input/output device(s) 503, such as monitors, keyboards, pointing devices, etc., which may communicate with communication infrastructure 506 through user input/output interface(s) 502. One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random-access memory (RAM). Main memory 508 may include one or more levels of cache. Main memory 508 may have stored therein control logic (i.e., computer software, instructions, etc.) and/or data. Computer system 500 may also include one or more secondary storage devices or secondary memory 510. Secondary memory 510 may include, for example, a hard disk drive 512 and/or a removable storage device or removable storage drive 514. Removable storage drive 514 may interact with a removable storage unit 518. Removable storage unit 518 may include a computer-usable or readable storage device having stored thereon computer software (control logic) and/or data. Removable storage drive 514 may read from and/or write to removable storage unit 518.

Secondary memory 510 may include other means, devices, components, instrumentalities, or other approaches for allowing computer programs and/or other instructions and/or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface, a removable memory chip (such as an EPROM or PROM) and associated socket, a memory stick and USB port, a memory card and associated memory card slot, and/or any other removable storage unit and associated interface.

Computer system 500 may further include communications interface 524 (e.g., network interface). Communications interface 524 may enable computer system 500 to communicate and interact with any combination of external devices, external networks, external entities, etc. (individually and collectively referenced as remote device(s), network(s), entity(ies) 528). For example, communications interface 524 may allow computer system 500 to communicate with external or remote device(s), network(s), entity(ies) 528 over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smartphone, smartwatch or other wearable devices, appliance, part of the Internet-of-Things, and/or embedded system, to name a few non-limiting examples, or any combination thereof.

Computer system 500 may be a client or server computing device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

FIG. 6 illustrates an example machine of a computer system 900 within which a set of instructions, for causing the machine to perform any one or more of the operations discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, a specialized application or network security appliance or device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), etc.), a static memory 906 (e.g., flash memory, static random-access memory (SRAM), etc.), and a data storage device 918, which communicate with each other via a bus 930.

Processing device 902 represents one or more processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application-specific integrated circuit (ASIC), a field-programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910, an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable medium 924 (also known as a computer-readable storage medium) on which is stored one or more sets of instructions 926 (e.g., software instructions) embodying any one or more of the operations described herein. The instructions 926 may also reside, completely or at least partially, within the main memory 904 and/or within the processing device 902 during execution thereof by the computer system 900, where the main memory 904 and the processing device 902 also constitute machine-readable storage media.

In an example, the instructions 926 include instructions to implement operations and functionality corresponding to the disclosed subject matter. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions 926. The term "machine-readable storage medium" shall also be taken to include any medium that is capable of storing or encoding a set of instructions 926 for execution by the machine and that cause the machine to perform any one or more of the operations of the present disclosure. The term "machine-readable storage medium" shall accordingly be taken to include, but not be limited to, solid-state memories, optical media, and magnetic media.

Some portions of the detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The operations and illustrations presented herein are not inherently related to any particular computer or other apparatus. Various types of systems may be used with programs in accordance with the teachings herein, or it may prove convenient to construct a more specialized apparatus to perform the operations. The structure for a variety of these systems will appear as set forth in the description herein. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIGS. 5 and 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A method for a multi-authority functional encryption scheme implemented in a distributed computing environment, the method comprising:
   executing, by a hardware processor of a computing device, a global setup routine, the global setup routine comprising:
   receiving a security parameter $\lambda$, wherein the security parameter is a positive integer that determines a level of cryptographic security;
   generating two groups G and $G_T$ with generators g and $g_T$, wherein G and $G_T$ are prime-order bilinear groups and g and $g_T$ are elements that generate their respective groups;
   outputting global parameter GP based on groups G and $G_T$, wherein the global parameter includes descriptions of the groups G and $G_T$ and a hash function;
   storing, in a non-transitory hardware storage device, the global parameter GP;
   executing, by the hardware processor, a local setup routine to generate public keys and master secret keys for each attribute authority independently, the local setup routine comprising:
   based on the global parameter GP:
   1. generating a random vector as $\alpha$ and a random matrix Y, wherein $\alpha$ is a vector in $\mathbb{Z}_q^n$ and Y is a matrix in $\mathbb{Z}_q^{s \times n}$ for positive integers s and n;
   2. computing $g_T^\alpha$, wherein $g_T^\alpha$ represents the element $g_T$ raised to the power of each component of vector $\alpha$;
   3. computing $g^Y$, wherein $g^Y$ represents the element g raised to the power of each component of matrix Y;
   outputting an authority public key as $g_T^\alpha$ and $g^Y$;
   outputting an authority master secret key as $\alpha$ and Y;
   storing, in the non-transitory hardware storage device, the public key and the master secret key;
   generating, by the hardware processor, a secret key K for a user by:
   receiving, via a network interface of the computing device, a global identifier GID for a user, wherein the global identifier uniquely identifies the user in the system;
   receiving, from the non-transitory hardware storage device, the master secret key for an authority;
   receiving, from the non-transitory hardware storage device, the global parameter GP;
   receiving, via the network interface, a function u representing a linear function, wherein u is a vector in $\mathbb{Z}_q^n$;
   based on the global identifier GID, master secret key, and global parameter GP:
   1. computing, using a cryptographic processing module of the hardware processor, $g^{\alpha \cdot u}$, wherein $\alpha \cdot u$ represents an inner product of vectors $\alpha$ and u;
   2. computing, using the cryptographic processing module, a hash function on the GID combined with u and i to generate group elements $h_i$, wherein the hash function maps strings to elements in group G;
   3. computing, using the cryptographic processing module, $h_i^{y_i \cdot u}$ where $y_i$ is the $i^{th}$ row of Y, and $y_i \cdot u$ represents an inner product of vectors $y_i$ and u;
   outputting the secret key $K = g^{\alpha \cdot u} * h_i^{y_i \cdot u}$, wherein * represents a group operation in G;
   storing, in the non-transitory hardware storage device, the secret key K;
   executing, by the hardware processor, an encryption routine by:
   receiving, via the network interface, the global parameter GP, an access structure M, the public keys, and a message v, wherein M is a matrix in $\mathbb{Z}_q^{l \times s}$ for positive integer l and v is a vector in $\mathbb{Z}_q^n$;
   sampling, using a secure random number generator of the computing device, a random vector r and two random matrices B and X, the matrices having row indices i, wherein a first row of the matrix B is z, and r is a vector in $\mathbb{Z}_q^t$, B is a matrix in $\mathbb{Z}_q^{s \times n}$, and X is a matrix in $\mathbb{Z}_q^{(S-1) \times n}$;

based on the global parameter GP, an access structure M, the public keys, and a message v:
1. computing, using the cryptographic processing module, $C_0 = g_T^{v+z}$, wherein v+z represents a component-wise addition of vectors v and z;
2. computing, using the cryptographic processing module, $C_{1,i} = g_T^{M_i * B + r_i * \alpha_i}$, wherein $M_i$ is the i-th row of matrix M, $M_i * B$ represents matrix multiplication, and $r_i * \alpha_i$ represents scalar multiplication of vector $\alpha_i$ by scalar $r_i$;
3. computing, using the cryptographic processing module, $C_2 = g^r$, wherein $g^r$ represents the element g raised to the power of each component of vector r;
4. computing, using the cryptographic processing module, $C_{3,i} = g^{M_i * X + r * Y_i}$, wherein $M_i * X$ represents matrix multiplication and $r * Y_i$ represents scalar multiplication of matrix $Y_i$ by scalar r;

outputting $C_0$, $C_{1,i}$, $C_2$, $C_{3,i}$ as a ciphertext;
storing, in the non-transitory hardware storage device, the ciphertext;
transmitting, via the network interface over the communications network to a cloud storage system, the ciphertext;
executing, by the hardware processor, a decryption routine:
  receiving, via the network interface, the ciphertext from the cloud storage system over the communications network;
  receiving, from the non-transitory hardware storage device, the secret key K;
  receiving, from the non-transitory hardware storage device, the global parameter GP;
  receiving, from the non-transitory hardware storage device, the global identifier GID for the user;
  based on the global identifier GID, the ciphertext, secret key K, and global parameter GP:
  1. computing, using the cryptographic processing module, the hash function on the GID combined with u and i to generate group elements $h_i$;
  2. computing, using the cryptographic processing module, $d_i = e(h_i, C_{3,i} * u)$, wherein e is a bilinear map from G×G to $G_T$, and $C_{3,i} * u$ represents the component-wise multiplication of $C_{3,i}$ with vector u;
  3. computing, using the cryptographic processing module, $w_i = e(K, G_{2,i})$, wherein e is the bilinear map;
  outputting $C_0 * u / (C_{1,i} * u * d_i) / w_i$, wherein $C_0 * u$ represents the component-wise multiplication of $C_0$ with vector u, and / represents division in the group $G_T$, and wherein taking the discrete logarithm of this output yields an inner product of vectors u and v; and
  transmitting, via the network interface over the communications network to a user device, the inner product result for use in a privacy-preserving computation.

2. The method of claim 1, further comprising distributing the secret key K over the communications network by only one authority.

3. The method of claim 1, wherein each user is identified by a set of attributes and a decryption ability for each encrypted message is based on a function of the attributes.

4. The method of claim 3, further comprising distributing the secret key K over the communications network by any polynomial number of independent authorities.

5. The method of claim 4, further comprising selecting, for each independent authority, a predetermined number and a set of attributes whereby the user is only able to decrypt the ciphertext when the user has at least the predetermined number of attributes from each authority.

6. A system for a multi-authority functional encryption scheme implemented in a distributed computing environment, the system comprising:
a non-transitory hardware storage device; and
a hardware processor configured for executing a global setup routine, the global setup routine comprising:
  receiving a security parameter λ, wherein the security parameter is a positive integer that determines a level of cryptographic security;
  generating two groups G and $G_T$ with generators g and $g_T$, wherein G and $G_T$ are prime-order bilinear groups and g and $g_T$ are elements that generate their respective groups;
  outputting global parameter GP based on groups G and $G_T$, wherein the global parameter includes descriptions of the groups G and $G_T$ and a hash function;
  storing, in a the non-transitory hardware storage device, the global parameter GP;
executing, by the hardware processor, a local setup routine to generate public keys and master secret keys for each attribute authority independently, the local setup routine comprising:
  based on the global parameter GP:
  1. generating a random vector as α and a random matrix Y, wherein α is a vector in $\mathbb{Z}_q^n$ and Y is a matrix in $\mathbb{Z}_q^{s \times n}$ for positive integers s and n;
  2. computing $g_T^\alpha$, wherein $g_T^\alpha$ represents the element $g_T$ raised to the power of each component of vector α;
  3. computing $g^Y$, wherein $g^Y$ represents the element g raised to the power of each component of matrix Y;
  outputting an authority public key as $g_T^\alpha$ and $g^Y$;
  outputting an authority master secret key as α and Y;
  storing, in the non-transitory hardware storage device, the public key and the master secret key;
  receiving, via a network interface of the system over a communications network from a data owner device, a message v, wherein v is a vector in $\mathbb{Z}_q^n$ representing sensitive data;
generating, by the hardware processor, a secret key K for a user by:
  receiving, via the network interface, a global identifier GID for a user, wherein the global identifier uniquely identifies the user in the system;
  receiving, from the non-transitory hardware storage device, the master secret key for an authority;
  receiving, from the non-transitory hardware storage device, the global parameter GP;
  receiving, via the network interface, a function u representing a linear function, wherein u is a vector in $\mathbb{Z}_q^n$;
  based on the global identifier GID, master secret key, and global parameter GP:
  1. computing, using a cryptographic processing module of the hardware processor, $g^{\alpha \cdot u}$, wherein $\alpha \cdot u$ represents an inner product of vectors α and u;
  2. computing, using the cryptographic processing module, a hash function on the GID combined with u and i to generate group elements $h_i$, wherein the hash function maps strings to elements in group G;

3. computing, using the cryptographic processing module, $h_i^{y_i \cdot u}$ where $y_i$ is the $i^{th}$ row of Y, and $y_i \cdot u$ represents an inner product of vectors $y_i$ and u;

outputting the secret key $K=g^{\alpha \cdot u} * h_i^{y_i \cdot u}$, wherein * represents a group operation in G;

storing, in the non-transitory hardware storage device, the secret key K;

executing, by the hardware processor, an encryption routine by:

receiving, via the network interface, the global parameter GP, an access structure M, the public keys, and a message v, wherein M is a matrix in $\mathbb{Z}_q^{l \times s}$ for positive integer l and v is a vector in $\mathbb{Z}_q^n$;

sampling, using a secure random number generator of the system, a random vector r and two random matrices B and X, the matrices having row indices i, wherein a first row of the matrix B is z, and r is a vector in $\mathbb{Z}_q^l$, B is a matrix in $\mathbb{Z}_q^{s \times n}$, and X is a matrix in $\mathbb{Z}_q^{(s-1) \times n}$;

based on the global parameter GP, an access structure M, the public keys, and a message v:

1. computing, using the cryptographic processing module, $C_0 = g_T^{v+z}$, wherein v+z represents a component-wise addition of vectors v and z;

2. computing, using the cryptographic processing module, $C_{1,i} = g_T^{M_i * B + r_i * \alpha_i}$, wherein $M_i$ is the i-th row of matrix M, $M_i * B$ represents matrix multiplication, and $r_i * \alpha_i$ represents scalar multiplication of vector $\alpha_i$ by scalar $r_i$;

3. computing, using the cryptographic processing module, $C_2 = g^r$, wherein $g^r$ represents the element g raised to the power of each component of vector r;

4. computing, using the cryptographic processing module, $C_{3,i} = g^{M_i * X + r * Y_i}$, wherein $M_i * X$ represents matrix multiplication and $r * Y_i$ represents scalar multiplication of matrix $Y_i$ by scalar r;

outputting $C_0$, $C_{1,i}$, $C_2$, $C_{3,i}$ as a ciphertext;

storing, in the non-transitory hardware storage device, the ciphertext;

transmitting, via the network interface over the communications network to a cloud storage system, the ciphertext;

executing, by the hardware processor, a decryption routine:

receiving, via the network interface, the ciphertext from the cloud storage system over the communications network;

receiving, from the non-transitory hardware storage device, the secret key K;

receiving, from the non-transitory hardware storage device, the global parameter GP;

receiving, from the non-transitory hardware storage device, the global identifier GID for the user;

based on the global identifier GID, the ciphertext, secret key K, and global parameter GP:

1. computing, using the cryptographic processing module, the hash function on the GID combined with u and i to generate group elements $h_i$;

2. computing, using the cryptographic processing module, $d_i = e(h_i, C_{3,i} * u)$, wherein e is a bilinear map from G×G to $G_T$, and $C_{3,i} * u$ represents the component-wise multiplication of $C_{3,i}$ with vector u;

3. computing, using the cryptographic processing module, $w_i = e(K, C_{2,i})$, wherein e is the bilinear map;

outputting $C_0 * u / (C_{1,i} * u * d_i) / w_i$, wherein $C_0 * u$ represents the component-wise multiplication of $C_0$ with vector u, and / represents division in the group $G_T$, and wherein taking the discrete logarithm of this output yields an inner product of vectors u and v; and transmitting, via the network interface over the communications network to a user device, the inner product result for use in a privacy-preserving computation.

7. The system of claim 6, further comprising distributing the secret key K over the communications network by only one authority.

8. The system of claim 6, wherein each user is identified by a set of attributes and a decryption ability for each encrypted message is based on a function of the attributes.

9. The system of claim 8, further comprising distributing the secret key K over the communications network by any polynomial number of independent authorities.

10. The system of claim 9, further comprising selecting, for each independent authority, a predetermined number and a set of attributes whereby the user is only able to decrypt the ciphertext when the user has at least the predetermined number of attributes from each authority.

11. A non-transitory computer-readable storage medium storing instructions that, when executed by a hardware processor, cause the processor to perform a method for a multi-authority functional encryption scheme implemented in a distributed computing environment, the method comprising:

executing a global setup routine, the global setup routine comprising:

receiving a security parameter λ, wherein the security parameter is a positive integer that determines a level of cryptographic security;

generating two groups G and $G_T$ with generators g and $g_T$, wherein G and $G_T$ are prime-order bilinear groups and g and $g_T$ are elements that generate their respective groups;

outputting global parameter GP based on groups G and $G_T$, wherein the global parameter includes descriptions of the groups G and $G_T$ and a hash function;

storing, in a non-transitory hardware storage device, the global parameter GP;

executing a local setup routine to generate public keys and master secret keys for each attribute authority independently, the local setup routine comprising:

based on the global parameter GP:

1. generating a random vector as α and a random matrix Y, wherein α is a vector in $\mathbb{Z}_q^n$ and Y is a matrix in $\mathbb{Z}_q^{s \times n}$ for positive integers s and n;

2. computing $g_T^\alpha$, wherein $g_T^\alpha$ represents the element $g_T$ raised to the power of each component of vector α;

3. computing $g^Y$, wherein $g^Y$ represents the element g raised to the power of each component of matrix Y;

outputting an authority public key as $g_T^\alpha$ and $g^Y$;

outputting an authority master secret key as α and Y;

storing, in the non-transitory hardware storage device, the public key and the master secret key;

receiving, via a network interface over a communications network from a data owner device, a message v, wherein v is a vector in $\mathbb{Z}_q^n$ representing sensitive data;

generating, by the hardware processor, a secret key K for a user by:
  receiving, via the network interface, a global identifier GID for a user, wherein the global identifier uniquely identifies the user in the system;
  receiving, from the non-transitory hardware storage device, the master secret key for an authority;
  receiving, from the non-transitory hardware storage device, the global parameter GP;
  receiving, via the network interface, a function u representing a linear function, wherein u is a vector in $\mathbb{Z}_q^n$;
  based on the global identifier GID, master secret key, and global parameter GP:
    1. computing, using a cryptographic processing module of the hardware processor, $g^{\alpha \cdot u}$, wherein $\alpha \cdot u$ represents an inner product of vectors $\alpha$ and u;
    2. computing, using the cryptographic processing module, a hash function on the GID combined with u and i to generate group elements $h_i$, wherein the hash function maps strings to elements in group G;
    3. computing, using the cryptographic processing module, $h_i^{y_i \cdot u}$ where $y_i$ is the $i^{th}$ row of Y, and $y_i \cdot u$ represents an inner product of vectors $y_i$ and u;
  outputting the secret key $K = g^{\alpha \cdot u} * h_i^{y_i \cdot y}$, wherein * represents a group operation in G;
  storing, in the non-transitory hardware storage device, the secret key K;
executing, by the hardware processor, an encryption routine by:
  receiving, via the network interface, the global parameter GP, an access structure M, the public keys, and a message v, wherein M is a matrix in $\mathbb{Z}_q^{l \times s}$ for positive integer l and v is a vector in $\mathbb{Z}_q^n$;
  sampling, using a secure random number generator of the computing device, a random vector r and two random matrices B and X, the matrices having row indices i, wherein a first row of the matrix B is z, and r is a vector in $\mathbb{Z}_q^l$, B is a matrix in $\mathbb{Z}_q^{s \times n}$, and X is a matrix in $\mathbb{Z}_q^{(s-1) \times n}$;
  based on the global parameter GP, an access structure M, the public keys, and a message v:
    1. computing, using the cryptographic processing module, $C_0 = g_T^{v+z}$, wherein v+z represents a component-wise addition of vectors v and z;
    2. computing, using the cryptographic processing module, $C_{1,i} = g_T^{M_i \cdot B + r_i * \alpha_i}$, wherein $M_i$ is the i-th row of matrix M, $M_i * B$ represents matrix multiplication, and $r_i * \alpha_i$ represents scalar multiplication of vector of by scalar $r_i$;
    3. computing, using the cryptographic processing module, $C_2 = g^r$, wherein $g^r$ represents the element g raised to the power of each component of vector r;
    4. computing, using the cryptographic processing module, $C_{3,i} = g^{M_i * X + r * Y_i}$, wherein $M_i * X$ represents matrix multiplication and $r * Y_i$ represents scalar multiplication of matrix $Y_i$ by scalar r;
  outputting $C_0, C_{1,i}, C_2, C_{3,i}$ as a ciphertext;
  storing, in the non-transitory hardware storage device, the ciphertext;
  transmitting, via the network interface, over the communications network to a cloud storage system, the ciphertext;
executing, by the hardware processor, a decryption routine:
  receiving, via the network interface, the ciphertext from the cloud storage system over the communications network;
  receiving, from the non-transitory hardware storage device, the secret key K;
  receiving, from the non-transitory hardware storage device, the global parameter GP;
  receiving, from the non-transitory hardware storage device, the global identifier GID for the user;
  based on the global identifier GID, the ciphertext, secret key K, and global parameter GP:
    1. computing, using the cryptographic processing module, the hash function on the GID combined with u and i to generate group elements $h_i$;
    2. computing, using the cryptographic processing module, $d_i = e(h_i, C_{3,i} * u)$, wherein e is a bilinear map from G×G to $G_T$, and $C_{3,i} * u$ represents the component-wise multiplication of $C_{3,i}$ with vector u;
    3. computing, using the cryptographic processing module, $w_i = e(K, C_{2,i})$, wherein e is the bilinear map;
  outputting $C_0 * u / (C_{1,i} * u * d_i) / w_i$, wherein $C_0 * u$ represents the component-wise multiplication of $C_0$ with vector u, and / represents division in the group $G_T$, and wherein taking the discrete logarithm of this output yields an inner product of vectors u and v; and
  transmitting, via the network interface over the communications network to a user device, the inner product result for use in a privacy-preserving computation.

12. The non-transitory computer-readable storage medium of claim 11, wherein the method further comprises distributing the secret key K over the communications network by only one authority.

13. The non-transitory computer-readable storage medium of claim 11, wherein each user is identified by a set of attributes and a decryption ability for each encrypted message is based on a function of the attributes.

14. The non-transitory computer-readable storage medium of claim 13, wherein the method further comprises distributing the secret key K over the communications network by any polynomial number of independent authorities.

15. The non-transitory computer-readable storage medium of claim 14, wherein the method further comprises selecting, for each independent authority, a predetermined number and a set of attributes whereby the user is only able to decrypt the ciphertext when the user has at least the predetermined number of attributes from each authority.

16. The method of claim 1, further comprising:
  generating, by the hardware processor, a revocation list identifying users whose access rights have been revoked; and
  updating the encryption routine to incorporate the revocation list, wherein the updated encryption routine prevents revoked users from decrypting newly encrypted messages.

17. The method of claim 1, wherein the encryption routine further comprises:
  applying a threshold secret sharing scheme to split the message v into multiple shares; and
  encrypting each share separately using different access structures, thereby requiring multiple authorities to cooperate for message decryption.

18. The system of claim 6, wherein:
the hardware processor is further configured to:
receive a request to modify an existing access structure;
generate a re-encryption key based on the modified access structure; and
re-encrypt existing ciphertexts using the re-encryption key without decrypting the ciphertexts.

19. The system of claim 6, wherein the hardware processor is further configured to:
implement a distributed key generation protocol among multiple authorities, wherein each authority contributes a portion of the master secret key, and no single authority possesses the complete master secret key.

20. The non-transitory computer-readable storage medium of claim 11, wherein the method further comprises:
generating audit logs for all encryption and decryption operations;
storing the audit logs in a tamper-evident data structure; and
providing a verification mechanism to detect unauthorized modifications to the audit logs.

\* \* \* \* \*